US012761956B2

(12) United States Patent
Simionescu et al.

(10) Patent No.: US 12,761,956 B2
(45) Date of Patent: Oct. 13, 2026

(54) PROPORTIONAL PERFORMANCE METRIC CONTROL FOR PHYSICAL FUNCTIONS OF A MEMORY DEVICE

(71) Applicant: Micron Technology, Inc., Boise, ID (US)

(72) Inventors: Horia C. Simionescu, Foster City, CA (US); Paul Roger Stonelake, Kihei, HI (US); Alex Ga Hing Tang, Cupertino, CA (US); Parag R. Maharana, Dublin, CA (US)

(73) Assignee: Micron Technology, Inc., Boise, ID (US)

( * ) Notice: Subject to any disclaimer, the term of this patent is extended or adjusted under 35 U.S.C. 154(b) by 430 days.

(21) Appl. No.: 18/533,260

(22) Filed: Dec. 8, 2023

(65) Prior Publication Data

US 2024/0202030 A1 Jun. 20, 2024

Related U.S. Application Data

(60) Provisional application No. 63/387,383, filed on Dec. 14, 2022.

(51) Int. Cl.
*G06F 9/50* (2006.01)
*G06F 3/06* (2006.01)

(52) U.S. Cl.
CPC ............ *G06F 9/5016* (2013.01); *G06F 3/061* (2013.01); *G06F 3/0659* (2013.01); (Continued)

(58) Field of Classification Search
None
See application file for complete search history.

(56) References Cited

U.S. PATENT DOCUMENTS 11,126,375 B2 * 9/2021 Zhu ......................... G06F 3/061
11,868,799 B2 1/2024 Liu
(Continued)

FOREIGN PATENT DOCUMENTS

CN 111949371 B 7/2022

OTHER PUBLICATIONS

International Search Report and Written Opinion for Application No. PCT/US2023/083386, mailed on Apr. 18, 2024, 10 pages.

*Primary Examiner* — Qing Yuan Wu
(74) *Attorney, Agent, or Firm* — Harrity & Harrity, LLP

(57) ABSTRACT

In some implementations, a memory device may allocate first credit amounts for respective physical functions from a set of physical functions associated with the memory device, wherein the first credit amounts correspond to allocations for one or more performance metrics for the set of physical functions over a time window. The memory device may allocate second credit amounts for the respective physical functions from the set of physical functions, wherein the second credit amounts correspond to allocations for the one or more performance metrics for virtual windows included in the time window, and wherein the second credit amounts are based on the first credit amounts and an amount of time associated with the time window. The memory device may perform, during each virtual window included in the time window, one or more operations associated with the set of physical functions based on the second credit amounts.

20 Claims, 12 Drawing Sheets

(52) U.S. Cl.
CPC .......... *G06F 9/5033* (2013.01); *G06F 9/5044* (2013.01); *G06F 3/06* (2013.01)

(56) References Cited

U.S. PATENT DOCUMENTS

| | | | |
|---|---|---|---|
| 2016/0188510 | A1 | 6/2016 | Singh et al. |
| 2020/0089640 | A1 | 3/2020 | Duncan |
| 2021/0019085 | A1 | 1/2021 | Zhu et al. |
| 2022/0027196 | A1 | 1/2022 | Singh et al. |

* cited by examiner

PROPORTIONAL PERFORMANCE METRIC CONTROL FOR PHYSICAL FUNCTIONS OF A MEMORY DEVICE

CROSS-REFERENCE TO RELATED APPLICATION

This Patent Application claims priority to U.S. Provisional Patent Application No. 63/387,383, filed on Dec. 14, 2022, and entitled "PROPORTIONAL PERFORMANCE METRIC CONTROL FOR PHYSICAL FUNCTIONS OF A MEMORY DEVICE." The disclosure of the prior Application is considered part of and is incorporated by reference into this Patent Application.

TECHNICAL FIELD

The present disclosure generally relates to memory devices, memory device operations, and, for example, to proportional performance metric control for physical functions of a memory device.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
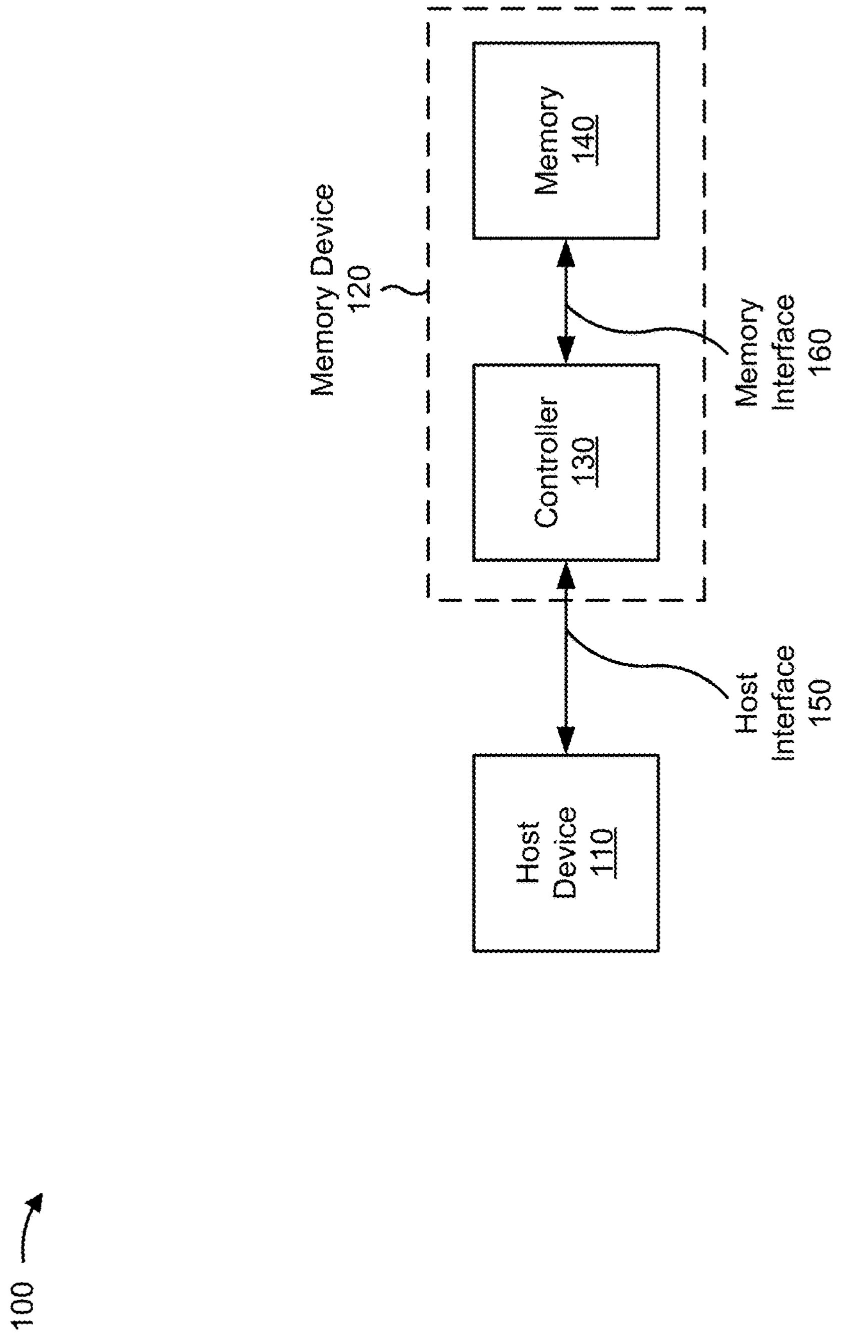
FIG. 1 is a diagram illustrating an example system capable of proportional performance metric control for physical functions of a memory device.

In some examples, a memory device may be associated with multiple physical functions (PFs). For example, the memory device may be a multi-function NAND device (MFND). A PF may be associated with a physical connection and/or a physical port associated with a host device. For example, a memory device may include multiple PFs and each PF may be advertised to a host device as a separate device (e.g., even though the PFs are associated with the same memory device). For example, a command to the memory device may be directed to a given PF of the memory device. In some cases, quality of service (QoS) management may be performed for the PFs associated with a memory device. For example, the QoS management may define an expected performance for each PF. For example, the memory device may control performance metrics for each PF in a given time window. For example, a bandwidth and/or input-output per second (IOPS) used by each PF may be controlled or limited in a given time window. For example, each PF may be allocated with credit amounts, where the credit amounts indicate a quantity of commands that can be performed by a given PF while satisfying the QoS limits for the given PF.

For example, the QoS provisioning of the different PFs may ensure that the memory device is not over-subscribed at given point in time. For example, the memory device may have a capacity (e.g., a bandwidth capacity or a throughput capacity, among other examples). The capacity of the memory device may be provisioned among multiple PFs such that the memory device is not over-subscribed (e.g., such that the capacity of the memory device is not exceeded) when multiple PFs of the memory device are in operation. For example, each PF may be configured (e.g., provisioned) with a capacity, a quantity of supported namespaces, and/or an expected performance for each PF, among other examples. For example, each PF may be configured with one or more limits, such as one or more bandwidth limits and/or one or more IOPS limits, among other examples. However, the limits on a given PF may be based on an advertised or known drive capability of the memory device, which may fluctuate or change over time. Therefore, in some cases, the memory device may become over-subscribed based on operations associated with various PFs of the memory device.

For example, when data is written to a memory component, the write operation is typically done at the page level, such that an entire page, or multiple pages, is written in a single operation. When the memory component is full, such that there is insufficient capacity to accept additional write operations, certain data can be erased in order to free up space. When data is erased from the memory component, however, it is typically done at the block level, such that an entire block (including multiple pages) is erased in a single operation. Thus, when a particular segment of data on the memory component is updated, for example, certain pages in a block will have data that has been re-written to a different page and/or is no longer needed. The entire block cannot simply be erased, as each block likely also has some number of pages of valid data. A garbage collection process can be performed which involves moving those pages of the block that contain valid data to another block, so that the current block can be erased and rewritten. Garbage collection is a form of automatic memory management that attempts to reclaim garbage, or memory occupied by stale data objects that are no longer in use (e.g., because they have been updated with new values). The basic principle of garbage collection is to find data objects that cannot or need not be accessed in the future, and to reclaim the resources (i.e., storage space) used by those objects. The additional writes that result from moving data from one block to another during the garbage collection process create a phenomenon referred to as write amplification.

For example, due to write amplification (e.g., additional write operations performed as part of the garbage collection process) or other operations of the memory device, an actual capacity of the memory device may be less than an advertised capacity of the memory device. As a result, the memory device may become over-subscribed and the PFs of the memory device may be unable to reach the limits configured for each PF. However, some PFs may be disproportionally impacted in the over-subscribed environments. For example, some PFs may be enabled to reach a configured limit (e.g., a IOPS limit or a bandwidth limit) while other PFs may not be enabled to reach a configured limit. In some examples, in an attempt to ensure that QoS limits (e.g., one or more bandwidth limits and/or one or more IOPS limits) are enforced among the PFs (e.g., to ensure that each PF does not exceed a configured QoS limit), a time window may be used to provision operations to each PF. For example, each PF may be configured with a quantity of credits that can be used for performing operations within a given time window. A credit can be used to process a portion of the data associated with an input/output (I/O) command. A memory device can be configured such that each I/O command can access data made up of one or more I/O command data blocks. In some examples, the credit scheme may be configured such that the cost to access one I/O command data block is one credit. Thus, one credit may be used for each I/O command data block of the data associated with an I/O operation in order to complete the entire I/O operation. For example, if the I/O operation is associated with 10 I/O command data blocks, then 10 credits may be used to complete the I/O operation. Additionally, the credit scheme may differentiate between different types of operations or different command types. For example, the memory device may be configured with a first set of credits for write operations and a second set of credits for read operations, among other examples. In this way, within the time window, each PF may perform operations until allocated credits are consumed. Therefore, over time, there may be a proportional impact on the PFs caused by over-subscribed environments and/or impacts to performance of the memory device.

However, in some cases, the time window approach may disproportionally impact PFs with larger provisions or limits. For example, a round-robin approach may be used to perform operations within a given time window (e.g., the memory device may perform operations for PFs moving through the PFs in a round-robin manner). In cases where the memory device is over-subscribed in a given time window, PFs with lower limits (e.g., with less credits allocated) may be enabled to consume or use all of the credits for the time window. However, PFs with higher limits (e.g., with more credits allocated) may be unable to consume or use all of the credits for the time window. As a result, the PFs with higher limits may be disproportionally impacted over time, resulting in degraded performance for the PFs.

Some implementations described herein enable proportional performance metric control for PFs of a memory device. For example, the memory device may allocate first credit amounts for respective physical functions from the set of physical functions. The first credit amounts may correspond to allocations for one or more performance metrics for the set of physical functions over a time window (e.g., a certain amount of time). The memory device may allocate second credit amounts for the respective physical functions from the set of physical functions. The second credit amount may correspond to allocations for the one or more performance metrics for virtual windows included in the time window. As used herein, a "virtual" window may refer to an amount of time associated with each PF, included in the set of PFs, consuming or using allocated credits for the PF. In other words, a virtual window may not be associated with a fixed amount of time, but may rather be defined based on an amount of time associated with each PF performing operations that cause a certain limit to be met (e.g., a quantity of credits to be consumed).

In some implementations, the second credit amounts may be based on the first credit amounts and an amount of time associated with the time window. For example, if a given PF is allocated 10 credits for a time window and the time window is associated with a duration of 10 milliseconds, then the second credit amount for the given PF may be 1 credit (e.g., 10 credits divided by 10 milliseconds). In other words, the second credit amounts may be credit amounts that are expected to be consumed by a given PF within a portion of the time window. The memory device may perform, during the time window, one or more operations associated with the set of physical functions. For example, the PFs of the memory device may perform operations until each of the PFs consumes credits allocated for the virtual windows. At that time, a credit counter may be reset and a new virtual window may be initialized. Each PF of the memory device may continue to perform operations in this manner until the time window expires or until a total credit amount for the time window is consumed by a PF (e.g., once a total credit amount for the time window is consumed by a given PF, the PF may refrain from performing additional operations in the time window).

As a result, proportionality of performance among the PFs of the memory device is improved. For example, even in time windows where the memory device is over-subscribed or experiences reduced performance, each PF may have a proportional degradation in achieved performance for the time windows because of the use of virtual windows within each time window, as described in more detail elsewhere herein. This improves a performance of the memory device by ensuring that certain PFs are not disproportionately impacted.

FIG. 1 is a diagram illustrating an example system 100 capable of proportional performance metric control for physical functions of a memory device 120. The system 100 may include one or more devices, apparatuses, and/or components for performing operations described herein. For example, the system 100 may include a host device 110 and the memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be associated with a set of physical functions. The memory device 120 and/or the controller 130 may be configured to allocate first credit amounts for respective physical functions from the set of physical functions, wherein the first credit amounts correspond to allocations for one or more performance metrics for the set of physical functions over a time window; allocate second credit amounts for the respective physical functions from the set of physical functions, wherein the second credit amounts correspond to allocations for the one or more performance metrics for virtual windows included in the time window, and wherein the second credit amounts are based on the first credit amounts and an amount of time associated with the time window; and perform, during the time window, one or more operations associated with the set of physical functions, wherein the one or more operations are associated with one or more virtual windows during the time window, and wherein each virtual window from the one or more virtual windows is associated with operations, included in the one or more operations, that cause all of the second credit amounts for the respective physical functions to be utilized.

In some implementations, the memory device 120 and/or the controller 130 may be configured to allocate first credit amounts for respective physical functions from a set of physical functions associated with the memory device 120, wherein the first credit amounts correspond to allocations for one or more performance metrics for the set of physical functions over a time window; allocate second credit amounts for the respective physical functions from the set of physical functions, wherein the second credit amounts correspond to allocations for the one or more performance metrics for virtual windows included in the time window, wherein the virtual windows have variable durations, and wherein the second credit amounts are based on the first credit amounts and an amount of time associated with the time window; and perform, during each virtual window included in the time window, one or more operations associated with the set of physical functions based on the second credit amounts.

In some implementations, the memory device 120 and/or the controller 130 may be configured to allocate first credit amounts for respective physical functions from a set of physical functions associated with the memory device 120, wherein the first credit amounts correspond to allocations for one or more performance metrics for the set of physical functions over a time window; allocate second credit amounts for the respective physical functions from the set of physical functions, wherein the second credit amounts correspond to allocations for the one or more performance metrics for virtual windows included in the time window, and wherein the second credit amounts are based on the first credit amounts and an amount of time associated with the time window; and perform, during each virtual window included in the time window, one or more operations associated with the set of physical functions based on the second credit amounts.

As indicated above, FIG. 1 is provided as an example. Other examples may differ from what is described with regard to FIG. 1.

Figure 2:
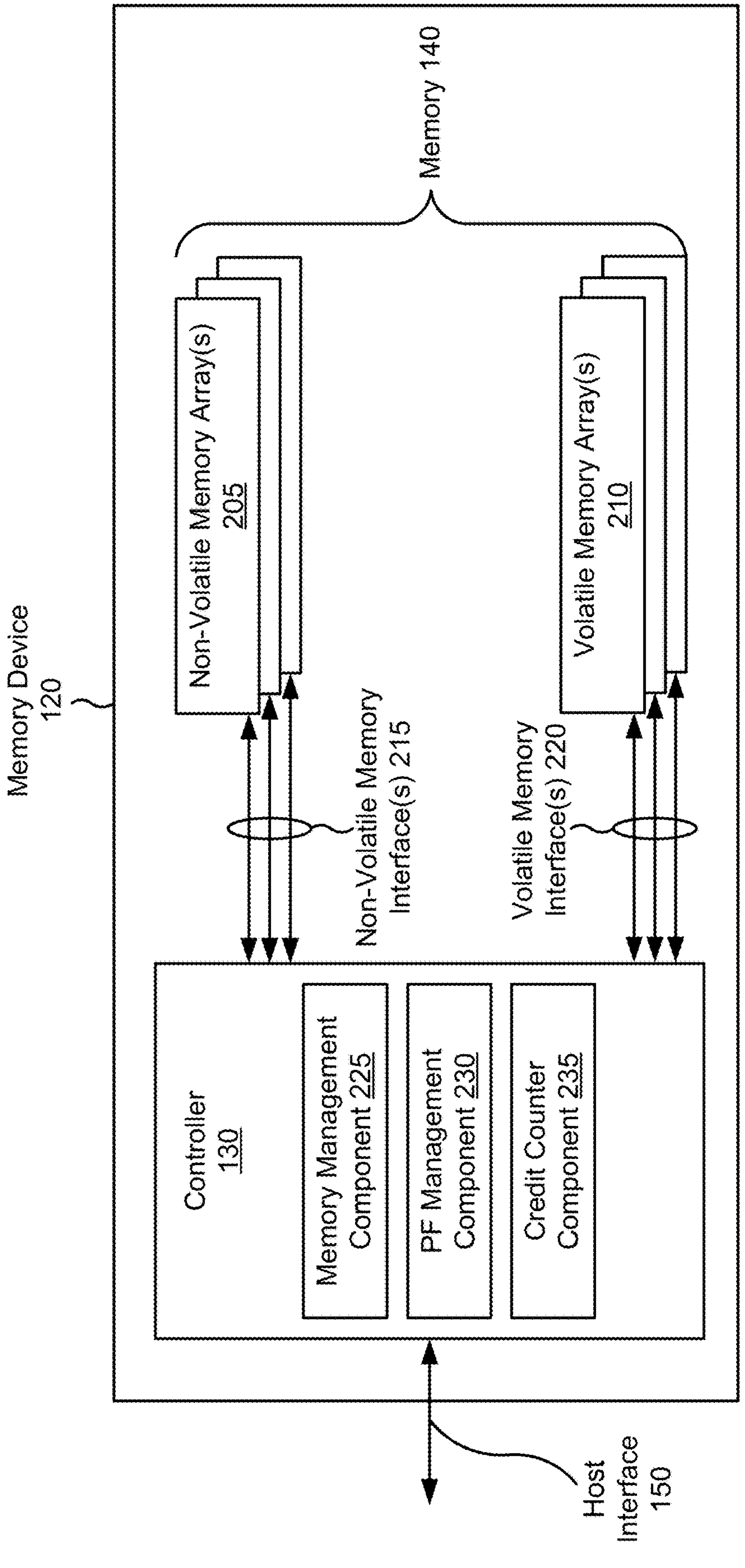
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, a PF management component 230, and/or a credit counter component 235. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The PF management component 230 may be configured to manage performance of one or more PFs associated with the memory device 120. The PF management component 230 may be configured to perform memory management operations for the one or more PFs. For example, the PF management component 230 may be configured to allocate resources, bandwidth, and/or throughput of the memory device 120 among multiple PFs associated with the memory device 120. In some implementations, the PF management component 230 may be configured to allocate credits for time windows and/or virtual windows for each PF, as described in more detail elsewhere herein.

The credit counter component 235 may be configured to manage, track, count, and/or allocate credits associated with performing operations for each PF associated with the memory device 120. For example, the credit counter component 235 may be configured to track credits allocated for a given PF (or multiple PFs) associated with the memory device 120. The credit counter component 235 may be configured to increment a counter based on obtaining a command associated with a PF and/or decrement a counter based on performing an operation associated with the PF.

One or more devices or components shown in FIG. 2 may be configured to perform operations described elsewhere herein, such as one or more operations and/or methods described in connection with FIGS. 3-5, 6A, 6B, and 7-11. For example, the controller 130, the memory management component 225, the PF management component 230, and/or the credit counter component 235 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
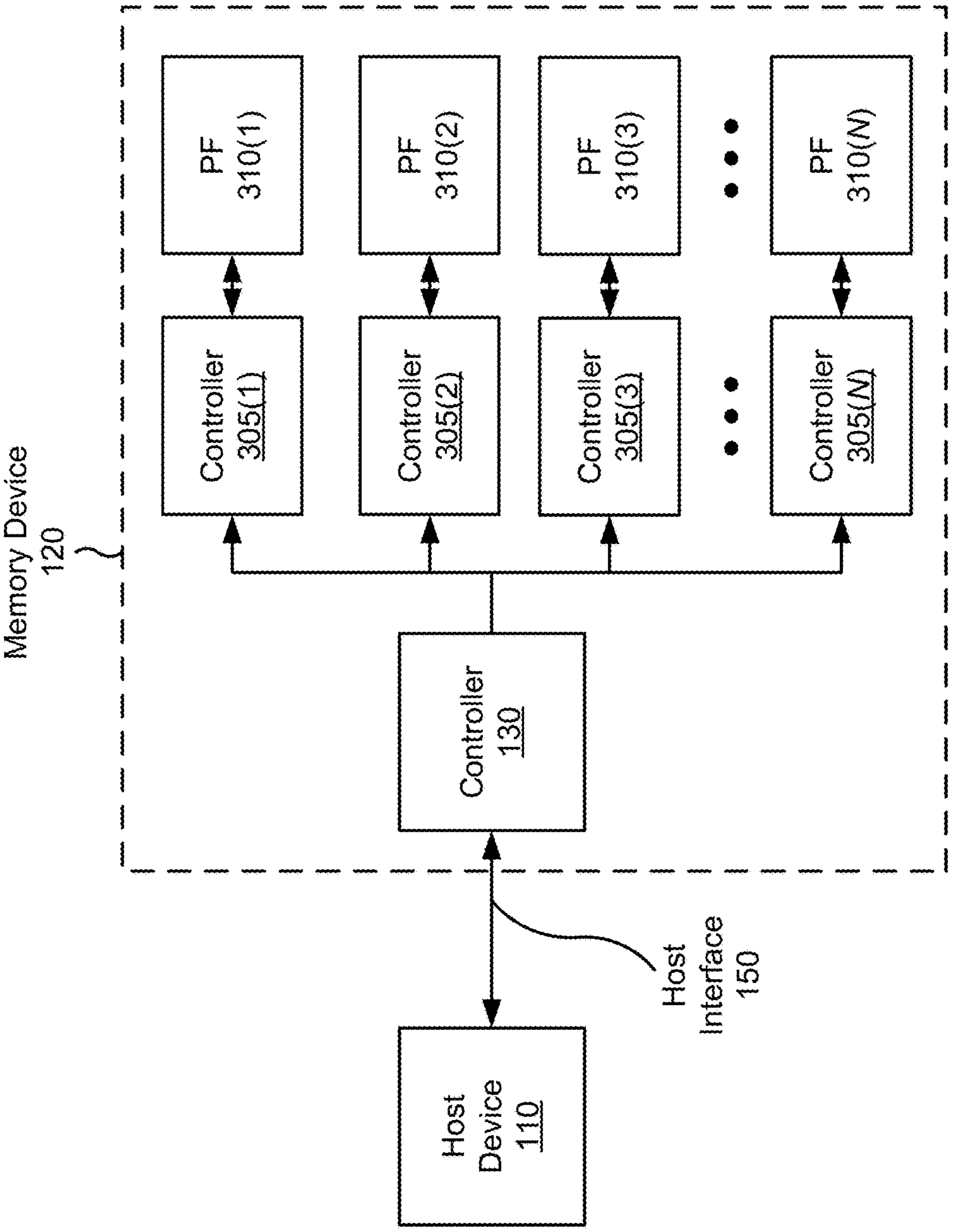
FIG. 3 is a diagram of an example memory device that includes multiple physical functions (PFs).

FIG. 3 is a diagram of an example memory device 120 that includes multiple PFs. As shown in FIG. 3, the memory device may include one or more controllers 305 (e.g., shown as controllers 305(1) through 305(N)). Depending on the implementation, there can be a single controller 305, or multiple virtual controllers 305. A virtual controller 305 may be a virtual entity that appears as a physical controller to other devices, such as the host device 110. FIG. 3 depicts four virtual controllers 305 and four corresponding physical functions 310. In other implementations, however, there can be any other number of controllers 305, each having a corresponding physical function. All of the controllers 305 may have the same priority and same functionality. The controllers 305 may be referred to as NVMe controllers or child controllers, among other examples.

Each of controllers 305 may manage storage access operations for the underlying memory device 120. For example, the controller 305(1) can receive data access requests from the host device 110 over the host interface 150, including requests to read, write, and/or erase data. In response to the request, the controller 305(1) may identify a physical memory address in the memory device 120 pertaining to a logical memory address in the request, perform the requested memory access operation on the data stored at the physical address, and return requested data and/or a confirmation or error message to the host device 110, as appropriate. Controllers 305(2) through 305(N) can function in the same or a similar fashion with respect to data access requests for memory device 120.

As described above, each of physical functions 310(1) through 310(N) may be associated with a single controller 305 in order to allow the single controller 305 to appear as a physical controller on the host interface 150. For example, a physical function 310(1) may correspond to the controller 305(1), a physical function 310(2) may correspond to the controller 305(2), a physical function 310(3) may correspond to the controller 305(3), and a physical function 310(N) may correspond to the controller 305(N). Physical functions 310(1) through 310(N) may be fully featured PCIe functions that can be discovered, managed, and manipulated like any other PCIe device, and thus can be used to configure and control a PCIe device. Each physical function 310(1) through 310(N) may have one or more virtual functions associated therewith. The virtual functions may be lightweight PCIe functions that share one or more resources with the physical function and with virtual functions that are associated with that physical function. Each virtual function may have a PCIe memory space, which is used to map its register set. The virtual function device drivers operate on the register set to enable the virtual function functionality, and the virtual function appears as an actual PCIe device, accessible by host device 110 over the host interface 150.

Each physical function 310(1) through 310(N) can be assigned to any one of virtual machines in the host device 110. When input/output (I/O) data is received at a controller 305 from a virtual machine, a virtual machine driver provides a guest physical address for a corresponding read/write command. The physical function number can be translated to a bus, device, and function (BDF) number and then added to a direct memory access (DMA) operation to perform the DMA operation on the guest physical address. In one example, the controller 130 further transforms the guest physical address to a system physical address for the memory device 120.

Furthermore, each physical function 310(1) through 310(N) can be implemented in either a privileged mode or a normal mode. When implemented in the privileged mode, a physical function has a single point of management that can control resource manipulation and storage provisioning for other functions implemented in the normal mode. In addition, a physical function in the privileged mode can perform management operations including, for example, enabling/disabling of multiple physical functions, storage and quality of service (QoS) provisioning, firmware and controller updates, vendor unique statistics and events, diagnostics, and/or secure erase/encryption, among others. Typically, a first physical function can implement a privileged mode and the remainder of the physical functions can implement a normal mode. In other implementations, however, any of the physical functions can be configured to operate in the privileged mode. Accordingly, there can be one or more functions that run in the privileged mode.

QoS management can implemented by the controller 130 to access control services for each of the controllers 305. The access control services manage which devices have access permissions for the controllers 305. The access permissions can define, for example, which of virtual machines on host device 110 can access each of the controllers 305, as well as what operations each of the virtual machines can perform on each of the controllers 305. In one example, the controller 130 may control access permissions for each of the controllers 305 individually. For example, in the privileged mode, the controller 130 may grant a virtual machine permission to read and write data using the controller 305(1), but only permission to read data using the controller 305(2). Similarly, in the privileged mode, the controller 130 may grant a virtual machine permission to read and write data using the controller 305(2) only. Any combination of access permissions can be defined for the controllers 305. When a memory access request is received for one of the controllers 305, the controller 130 may analyze the conditions of the request (e.g., requestor, target, operation, and/or requested data address) based on access policies defining the access control services. The access policies can be stored in a local memory of the memory device 120. If the request satisfies the corresponding access policy (the conditions of the request match conditions specified in the corresponding access policy), then the controller 130 may grant the access request. Otherwise, the controller 130 may deny the request.

In some examples, a single physical function (e.g., PF 310(1)) may be a parent PF and/or parent controller and the remaining physical functions may be child PFs and/or child controllers. For example, the PF 310(1) may perform management operations for the other PFs of the memory device 120. For example, the PF 310(1) may perform provisioning, bandwidth and/or IOPS reservations, and/or other management operations for the other PFs of the memory device 120. In some implementations, the parent PF (e.g., the PF 310(1)) may perform QoS management for the other PFs of the memory device 120. For example, QoS may be provided by controlling performance metrics for each PF in a given time window. For example, a bandwidth and/or IOPS used by each PF may be controlled or limited in a given time window. For example, each PF may be allocated with credit amounts, where the credit amounts indicate a quantity of commands that can be performed by a given PF while satisfying the QoS limits for the given PF.

In some implementations, the physical functions 310(1) through 310(N) may be configured with full isolation and/or base isolation. "Full isolation" may refer to PFs that are associated with a logical die partition and a dedicated cursor (e.g., a write cursor or a folding pair cursor). For example, the memory device 120 may use a memory architecture to store data. The memory architecture may include a die, which may include multiple planes. A plane may include multiple blocks. A block may include multiple pages. A die may be a structure made of semiconductor material, such as silicon. In some implementations, a die is the smallest unit of memory that can independently execute commands. A memory device 120 may include one or more dies. In this case, multiple dies may each perform a respective memory operation (e.g., a read operation, a write operation, or an erase operation) in parallel. In some implementations, a die may be logically partitioned into different sections or parts. Full isolation may be provided at a logical die partition level, which may be managed through a cursor such that only one PF is associated with a given logical die partition. PFs configured with base isolation may share a logical die partition/cursor working fully isolated from other logical die partitions. A cursor may be a pointer that points to a next block that is to be programmed. For example, PFs associated with full isolation may be associated with a dedicated cursor, whereas PFs associated with base isolation may be associated with a shared cursor (e.g., shared with other PFs). In other words, PFs associated with base isolation may share a resource pool for operations.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more operations described as being performed by another set of components shown in FIG. 3.

Figure 4:
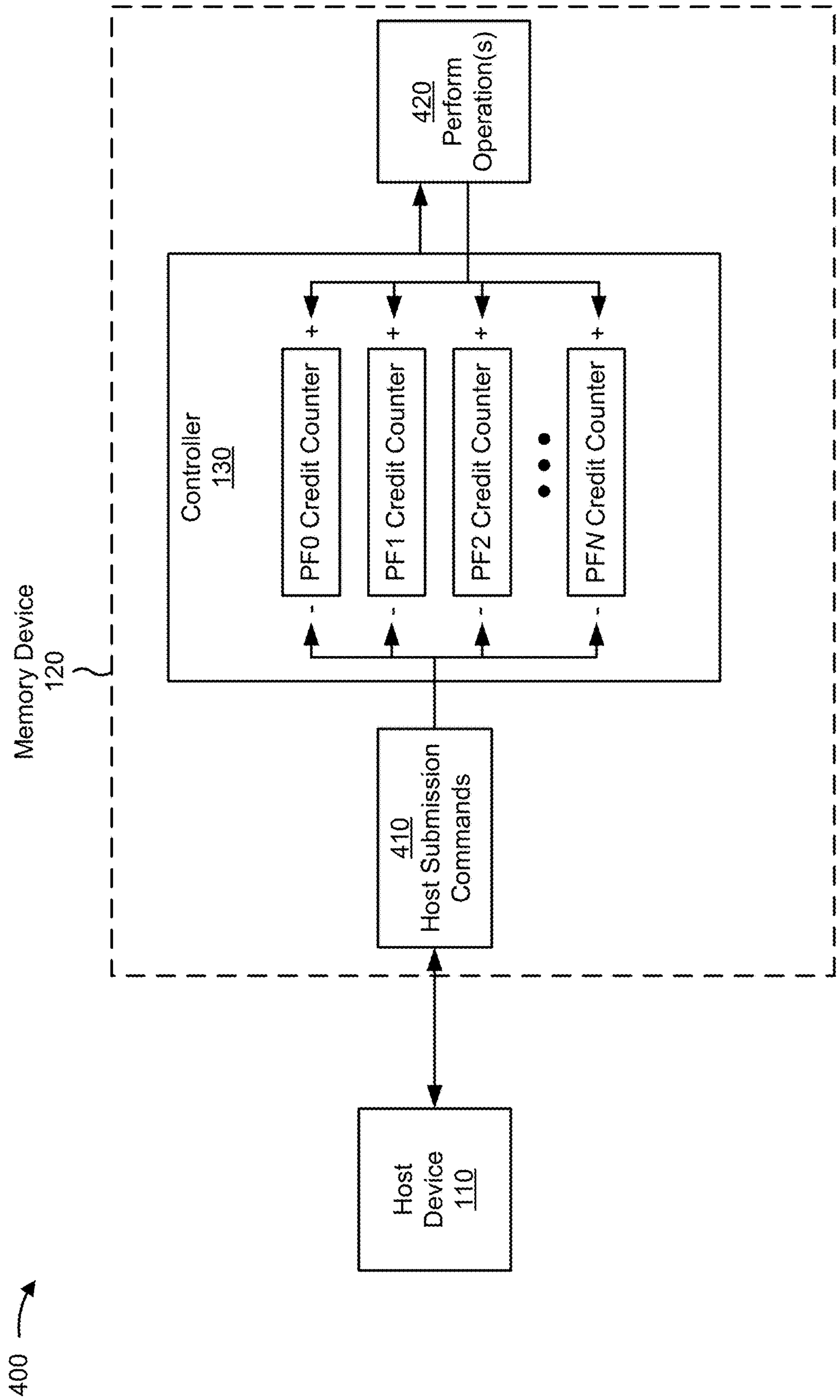
FIG. 4 is a diagram of an example of credit counting for physical functions of the memory device.

FIG. 4 is a diagram of an example 400 of credit counting for physical functions of the memory device 120. The operations described in connection with FIG. 4 may be performed by the memory device 120 and/or one or more components of the memory device 120, such as the controller 130 and/or one or more components of the controller 130.

As described elsewhere herein, PFs may be allocated with allowed limits for one or more performance metrics. For example, resources of the memory device 120 may be partitioned among, or provisioned to, various PFs of the memory device 120. The performance metrics may include a total bandwidth, a total IOPS, a write bandwidth (e.g., a bandwidth associated with write operations), and/or a write IOPS (e.g., an IOPS associated with write operations), among other examples. For example, each PF may be provided with an allowance for each performance metric indicating a limit or allowed performance of each PF.

For example, each PF may be configured with one or more credit amounts. In some implementations, a PF may be configured with a credit amount for each of the one or more performance metrics. For example, a given PF may be configured with a total bandwidth credit amount, a total IOPS credit amount, a write bandwidth credit amount, and/or a write IOPS credit amount, among other examples. For example, each PF may be configured with a quantity of credits that can be used for performing operations within a given time window. A credit can be used to process a portion of the data associated with an I/O command. The memory device 120 may be configured such that each I/O command can access data made up of one or more blocks. In some examples, the credit scheme may be configured such that the cost to access one block is one credit. Thus, one credit may be used for each block of the data associated with an I/O operation in order to complete the entire I/O operation. For example, if the I/O operation is associated with 10 blocks, then 10 credits may be used to complete the I/O operation.

As shown in FIG. 4, each PF of the memory device 120 may be associated with a credit counter that is associated with tracking a quantity of available credits for a given PF. In some implementations, the credit counters may be managed by the controller 130 (e.g., as shown in FIG. 4). Alternatively, a credit counter for a PF may be managed by a controller 305 associated with the PF.

In some implementations, each PF may be associated with one or more submission queues. A submission queue may be associated with one or more entries. Each entry may describe one operation to be performed by a PF, such as a read operation, a write operation, or an erase operation, among other examples. For example, as shown by reference number 410, host submission commands from the host device 110 may be stored in a submission queue associated with the PF that is to perform the command.

The memory device 120 and/or the controller 130 may download or obtain (e.g., fetch) a command for a PF only if the PF has available credits, as indicated by the credit counter associated with the PF. For example, the memory device 120 may only fetch commands from the submission queues of the PFs that have both total and write available credits. For each command downloaded or fetched from a submission queue, the memory device 120 and/or the controller 130 may decrement the credit counter for the PF. For example, the memory device 120 and/or the controller 130 may decrement available IOPS credits and/or bandwidth credits for the PF based on a size and/or a quantity of logical blocks associated with the command. If a PF does not have sufficient available credits, as indicated by the credit counter associated with the PF, then the memory device 120 and/or the controller 130 may refrain from obtaining or downloading a command from the submission queue(s) associated with the PF.

As shown by reference number 420, the memory device 120 and/or the controller 130 may perform operations associated with commands obtained from the submission queues. For example, the memory device 120 may perform one or more commands associated with a given PF of the memory device 120. In some implementations, based on performing an action associated with a command for a PF, a credit counter associated with the PF may be incremented. For example, the action may be completing the command, providing an indication to a hardware component of the memory device 120 to perform the command, providing an acknowledgement to the host device 110 that the command has been completed, and/or creating an entry in a completion queue associated with the PF, among other examples. In this way, the memory device 120 may ensure that each PF does not exceed the limits for the one or more performance metrics. This may ensure that the capability of the memory device 120 is not exceeded.

In some implementations, the memory device 120 and/or the controller 130 may use arbitration logic that determines the order in which requests and/or fill operations are to execute. The arbitration logic can specify scheduling requests and/or fill operations in the order in which the operations are received. In some implementations, the memory device 120 and/or the controller 130 may be configured to use a round-robin arbitration scheme (e.g., a round-robin arbiter) to perform operations associated with the PFs of the memory device 120. For example, a circular counter or buffer may be used to perform operations for the different PFs in a round-robin manner (e.g., after a given PF is given an opportunity to perform an operation, the given PF may be placed last in an order of PFs to be given opportunities to perform an operation).

However, as described elsewhere herein, the capability of the memory device 120 may vary over time. For example, due to write amplification, error recovery, NAND issues, PCIe or other data path error, among other examples, the capability of the memory device 120 may decrease at certain times. In an effort to proportion the decrease in the capability of the memory device among the PFs fairly and/or equally, the credits for the PFs may be managed and/or tracked using time windows (e.g., time slices), as depicted and described in more detail in connection with FIG. 5.

As indicated above, FIG. 4 is provided as an example. Other examples may differ from what is described with regard to FIG. 4.

Figure 5:
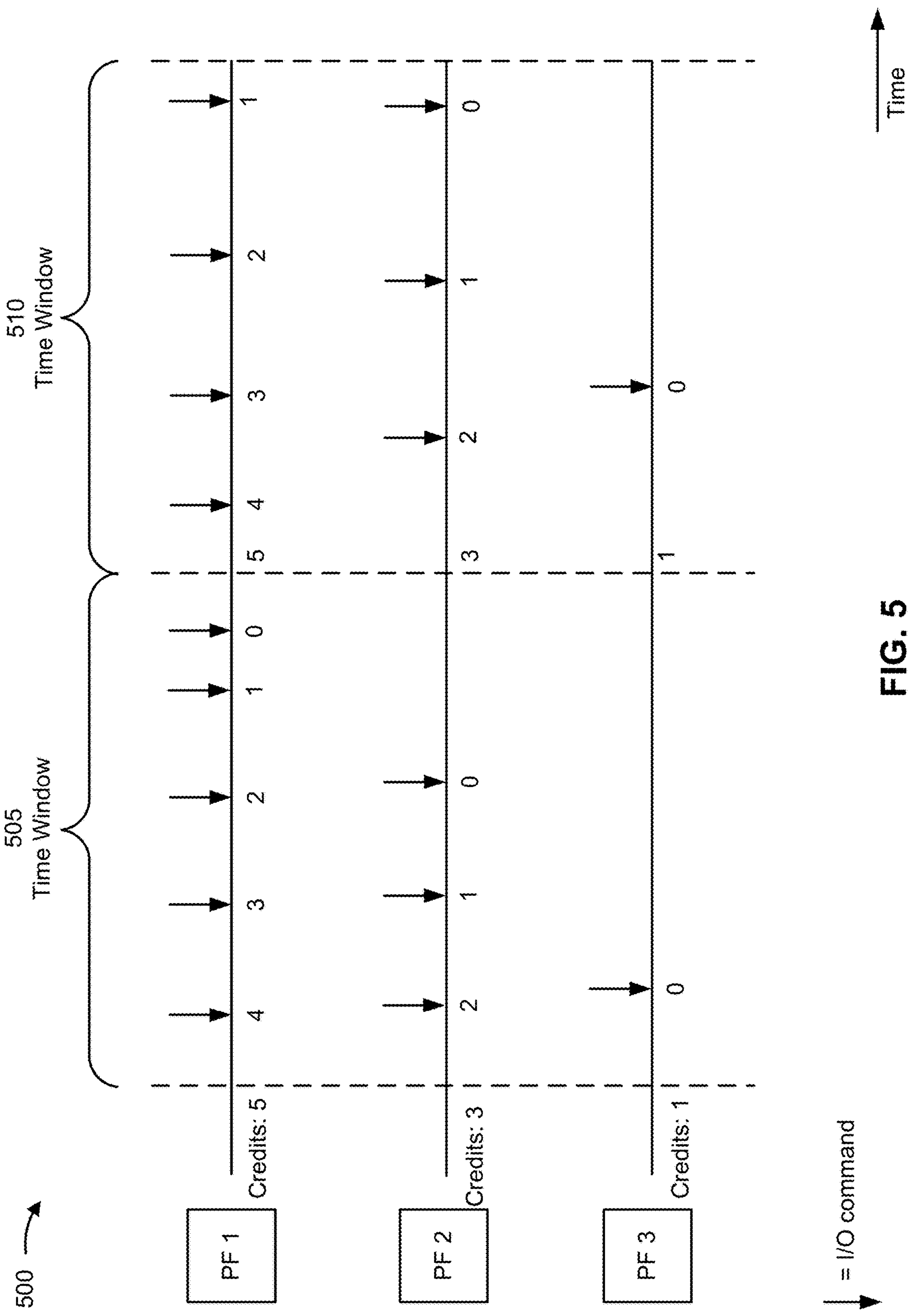
FIG. 5 is a diagram of an example of time windows for credit counting of PFs of the memory device.

FIG. 5 is a diagram of an example 500 of time windows for credit counting of PFs of the memory device 120. The operations described in connection with FIG. 5 may be performed by the memory device 120 and/or one or more components of the memory device 120, such as the controller 130 and/or one or more components of the controller 130.

As shown in FIG. 5, the memory device 120 and/or the controller 130 may track credits allocated for PFs using time windows (e.g., a time window 505 and a time window 510, as shown in FIG. 5). For example, FIG. 5 depicts three PFs (e.g., PF 1, PF 2, and PF 3), but the memory device 120 and/or the controller 130 may be configured to track and/or maintain credits for more or fewer PFs in a similar manner as described herein.

A time window (e.g., the time window 505 and/or the time window 510) may be associated with a configured amount of time. For example, a time window may have a duration of 10 milliseconds or another amount of time. Each PF may be configured with one or more credit amounts for each time window. For example, each PF may be enabled to use or consume credit amounts (e.g., total bandwidth credits, total IOPS credits, write bandwidth credits, and/or write IOPS credits) within each time window. If the PF performs operations that cause the credits to be used or consumed within a time window, then the PF may not perform additional operations within the time window. After the time window ends and a new time window begins, the credit counters for the PFs may be replenished (e.g., reset to the configured amount of credits available for the PFs in each time window).

For example, as shown in FIG. 5, the PF 1 may be configured with 5 available credits for each time window, the PF 2 may be configured with 3 available credits for each time window, and the PF 3 may be configured with 1 available credit in each time window. In the time window 505, as I/O commands are performed by the PFs, the available credits in the time window 505 for each PF may be decremented. For example, the PF 1 may perform 5 I/O commands in the time window 505, consuming all of the available credits for the PF 1. Similarly, the PF 2 may perform 3 I/O commands in the time window 505, consuming all of the available credits for the PF 2. The PF 3 may perform 1 (one) I/O command in the time window 505, consuming all of the available credits for the PF 3. In this way, the throughput of the memory device 120 may be split among the PFs within the time window 505 according to the allocated credits for the PFs.

In the time window 510, conditions of the memory device 120 may cause the PFs to be unable to perform as many operations as in the time window 505. For example, as shown in FIG. 5, the PF 1 may only be able to perform 4 I/O commands in the time window 510, leaving the PF 1 with unused credits. However, other PFs (e.g., the PF 2 and the PF 3) may be enabled to use the allocated credits during the time window 510. For example, because of the decrease in performance or throughput of the memory device 120, the PF 1 may be unable to reach the allowed performance for the PF 1.

For example, in time windows where a capability of the memory device 120 is less than a normal level, PFs provisioned with higher limits and/or higher quantities of credits (e.g., the PF 1) may be unable to consume all credits and/or reach an allowed performance level during the time windows. However, PFs provisioned with lower limits and/or lower quantities of credits (e.g., the PF 2 and the PF 3) may be able to consume all credits and/or reach an allowed performance level. Therefore, PFs provisioned with more credits and/or a higher allowed performance level (e.g., a higher bandwidth and/or IOPS) may be disproportionately impacted by the reduced capability of the memory device 120. This may be caused by the arbitration logic used by the memory device 120. For example, because of the round-robin arbitration technique used by the memory device 120, each PF may be given an opportunity to perform operations in a round-robin manner. This may leave higher provisioned PFs with unused credits in time windows where the memory device 120 has a reduced capability (e.g., due to write amplification, data path errors, or other issues). Additionally, the time windows may be too coarse of a sampling to ensure proportionality among PFs while also ensuring that QoS limits are satisfied. However, reducing a duration of the time window may result in some time windows without a meaningful quantity of commands. In other words, if QoS and/or credit limits are set using time windows with a shorter duration, some PFs may be configured with credit amounts that do not allow the PFs to perform a sufficient quantity of operations (e.g., PFs configured with lower quantities of credits for a 10 millisecond time window may not be configured with any credits if the time window were shortened). Therefore, to ensure proportionality among the PFs within a given time window, virtual windows may be used by the memory device 120 and/or the controller 130, as described in more detail elsewhere herein.

As indicated above, FIG. 5 is provided as an example. Other examples may differ from what is described with regard to FIG. 5.

Figure 6A:
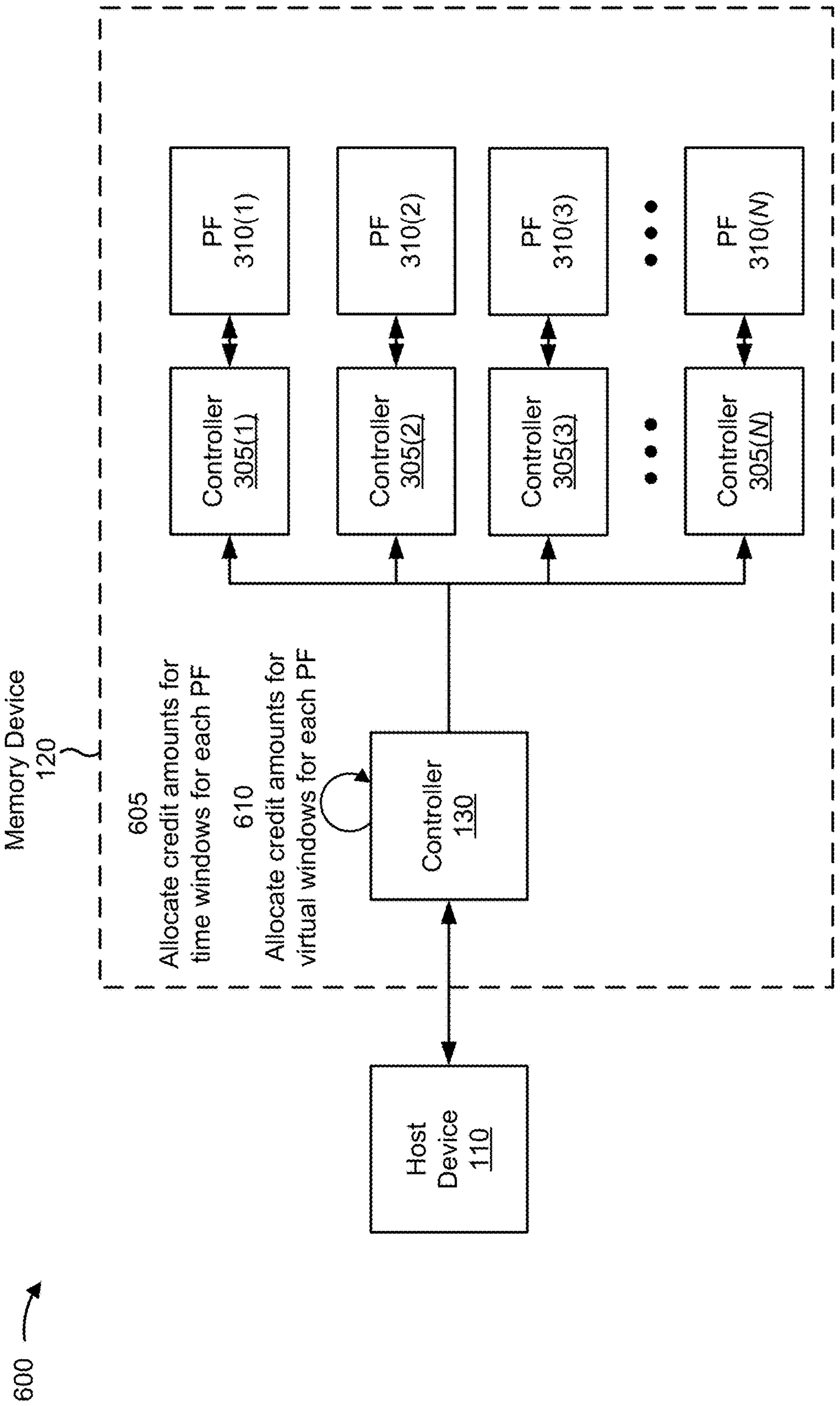
FIGS. 6A and 6B are diagrams of an example of proportional performance metric control for physical functions of the memory device.
Figure 6B:
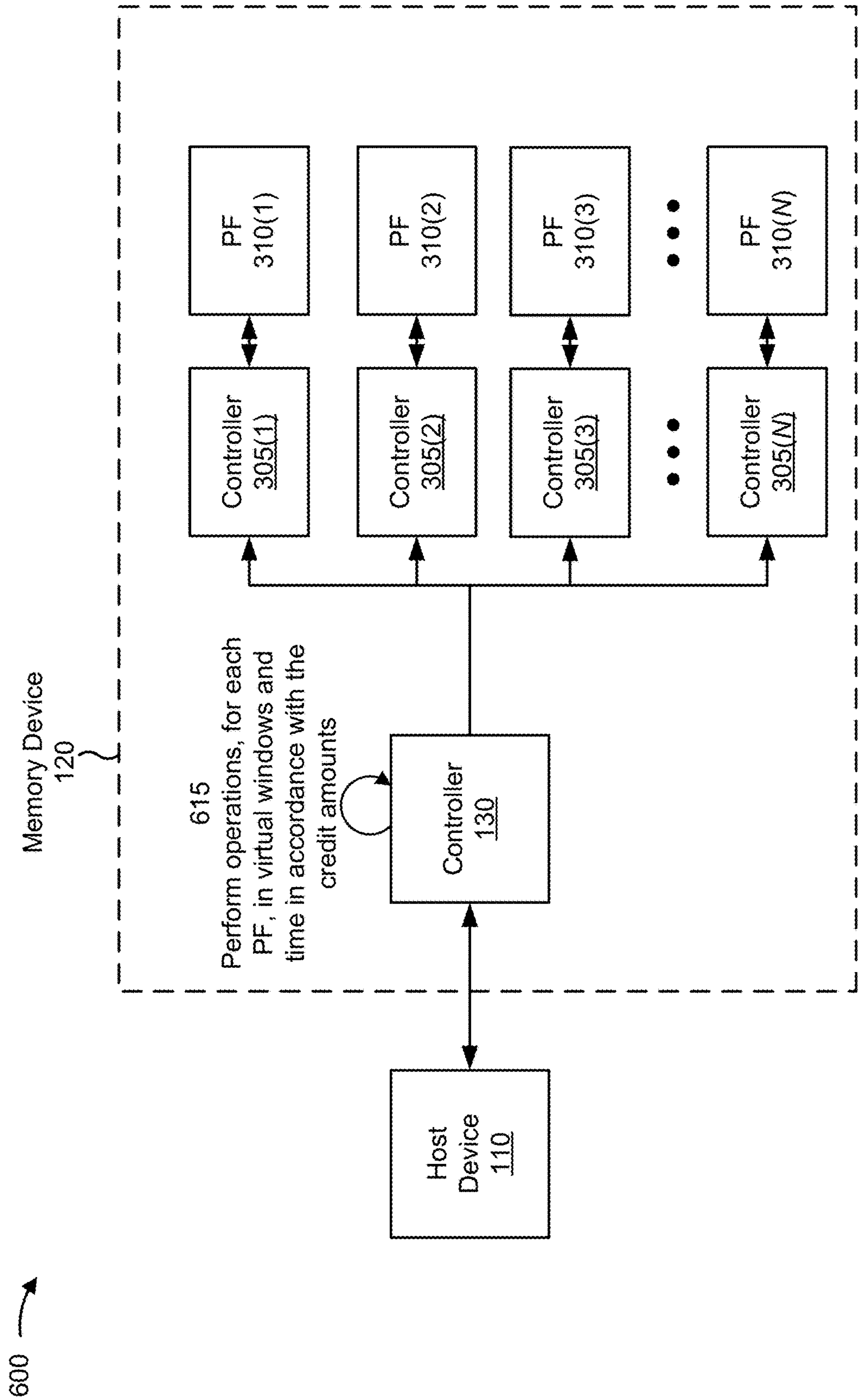

FIGS. 6A and 6B are diagrams of an example 600 of proportional performance metric control for physical functions of the memory device 120. The operations described in connection with FIGS. 6A and 6B may be performed by the memory device 120 and/or one or more components of the memory device 120, such as the controller 130 and/or one or more components of the controller 130. In some implementations, operations described herein as being performed by the controller 130 may be performed by one or more controllers 305.

As shown in FIG. 6A, and by reference number 605, the memory device 120 and/or the controller 130 may allocate credit amounts for time windows for each PF associated with the memory device 120. For example, the memory device 120 and/or the controller 130 may allocate first credit amounts for respective physical functions from a set of physical functions associated with the memory device 120 (e.g., the set of physical functions may include PF 310(1) through PF 310(N)). The first credit amounts may correspond to allocations for one or more performance metrics for the set of physical functions over a time window. For example, the time windows may have fixed durations, such as 10 milliseconds or another amount of time. The first credit amounts may be referred to herein as time window credit amounts.

For example, the time window credit amounts may include a first one or more credit amounts indicating one or more limits (e.g., QoS limits) for the one or more performance metrics during the time window. For example, a given PF may be configured with one or more time window credit amounts, corresponding to respective performance metrics, indicating one or more limits for the one or more performance metrics during each time window. The one or more performance metrics may include a total IOPS metric, a write operation IOPS metric, a total bandwidth metric, and/or a write operation bandwidth metric, among other examples. For example, each PF may be configured with, or allocated with, a total IOPS time window credit amount, a write operation IOPS time window credit amount, a total bandwidth time window credit amount, and/or a write operation bandwidth time window credit amount, among other examples. The memory device 120 and/or the controller 130 may allocate time window credits for each PF associated with the memory device 120.

As shown by reference number 610, the memory device 120 and/or the controller 130 may allocate credit amounts for virtual windows for each PF. For example, the memory device 120 and/or the controller 130 may allocate second credit amounts for the respective physical functions from the set of physical functions. The second credit amounts may correspond to allocations for the one or more performance metrics for virtual windows included in the time window. The second credit amounts may be referred to herein as virtual window credit amounts.

"Virtual window" may refer to an amount of time during a time window associated with each PF consuming a virtual window credit amount allocated for the PFs. For example, virtual windows may have variable durations. The variable durations may be based on an amount of time associated with performing the operations that cause all of the virtual window credit amounts for the respective physical functions to be utilized. For example, a virtual window may be closed once each PF utilizes or consumes a total credit amount (e.g., a total IOPS or bandwidth credit amount) and/or a write credit amount (e.g., a write operation IOPS or bandwidth credit amount) for the current virtual window. Therefore, a duration of the virtual window may not be fixed, but may rather vary based on an amount of time needed for each PF to consume or use the virtual window credit amounts.

The virtual window credit amounts may include one or more credit amounts indicating one or more limits (e.g., QoS limits) for the one or more performance metrics during each virtual window. For example, a given PF may be configured with one or more virtual window credit amounts, corresponding to respective performance metrics, indicating one or more limits for the one or more performance metrics during each virtual window. For example, each PF may be configured with, or allocated with, a total IOPS virtual window credit amount, a write operation IOPS virtual window credit amount, a total bandwidth virtual window credit amount, and/or a write operation bandwidth virtual window credit amount, among other examples. The memory device 120 and/or the controller 130 may allocate virtual window credits for each PF associated with the memory device 120.

In some implementations, the virtual window credit amounts for a given PF may be based on the time window credit amounts for the given PF and an amount of time associated with the time window. For example, the virtual window credits may be based on a portioning of the time window. For example, the time window may be partitioned into L segments. A virtual window credit amount may be an amount of credits that a given PF is expected to utilize or consume in each of the L segments, based on the quantity of time window credits allocated for the PF. In other words, if a PF is configured with, or allocated with, P credits, the virtual window credit amount may be P divided by L. For example, the memory device 120 and/or the controller 130 may calculate, for a PF from the set of PFs, a virtual window credit amount for the PF by dividing allocated time window credits for the PF by a value that is based on the quantity of segments in the time window.

As another example, the virtual window credit amount may be based on a duration of the time window. For example, the time window may be associated with a duration of M milliseconds. If a PF is configured with, or allocated with, P credits, the virtual window credit amount may be P divided by M. For example, the memory device 120 and/or the controller 130 may calculate, for a PF from the set of PFs, a virtual window credit amount for the PF by dividing allocated time window credits for the PF by a value that is based on the amount of time associated with the time window. In some implementations, the value may be the amount of time in milliseconds or seconds (e.g., if the amount of time is 10 milliseconds, then the value may be 10). In other examples, the value may be a portion of the amount of time in milliseconds or seconds. In other words, although virtual windows may be elastic and have no fixed duration, the virtual windows may be provisioned as if they have a certain duration. The memory device 120 and/or the controller 130 may calculate and/or allocate virtual window credit amounts for each performance metric and for each PF in a similar manner as described herein.

As shown in FIG. 6B, the memory device 120 and/or the controller 130 may perform operations based on the allocated time window credits and the allocated virtual window credits. For example, as shown by reference number 615, the memory device 120 and/or the controller 130 may perform, during a time window, one or more operations associated with the set of PFs. For example, the memory device 120 and/or the controller 130 may perform, during each virtual window included in the time window, one or more operations associated with the set of physical functions based on the virtual window credit amounts for each PF.

For example, the memory device 120 and/or the controller may perform, during a first virtual window, a first one or more operations until one or more limits, indicated by the virtual window credit amounts for each PF, are met. The memory device 120 and/or the controller 130 may perform, during a second virtual window, a second one or more operations until the one or more limits are met. In other words, the one or more operations may be associated with one or more virtual windows during the time window. Each virtual window may be associated with operations, included in the one or more operations, that cause all of the virtual window credit amounts for the respective PFs to be utilized.

For example, a virtual window may close when each PF, included in the set of PFs associated with the memory device 120, meets a limit indicated by the virtual window credits allocated with the respective PFs. For example, a limit may include a total virtual window credit amount (e.g., a total bandwidth credit amount and/or a total IOPS credit amount) and/or a write operation virtual window credit amount (e.g., a write operation bandwidth credit amount and/or a write operation IOPS credit amount). Additionally, a limit may include a limit indicated by the time window credit amounts. For example, a limit may include a total time window credit amount (e.g., a total bandwidth credit amount and/or a total IOPS credit amount) and/or a write operation time window credit amount (e.g., a write operation bandwidth credit amount and/or a write operation IOPS credit amount). In other words, a PF may reach a limit based on consuming a credit amount for a virtual window and/or for the entire time window. Once each PF reaches the limit, the virtual window may be closed and another virtual window may be initiated.

For example, the memory device 120 and/or the controller 130 may perform, during a virtual window, an operation, from the one or more operations associated with a PF. The memory device 120 and/or the controller 130 may decrement a counter associated with the PF based on performing the operation. For example, the counter may be associated with tracking a virtual credit amount, from the virtual credit amounts, that is associated with the PF and the virtual window. Additionally, the memory device 120 and/or the controller 130 may decrement one or more time window credit counters associated with tracking available time window credits for the PF. For example, the memory device 120 and/or the controller 130 may decrement both virtual window credit counters and time window credit counters for the PF when an operation associated with the PF is performed and/or completed.

After each virtual window closes and/or after initiating a new virtual window, the memory device 120 and/or the controller 130 may reset a first one or more limits, indicated by the virtual window credit amounts, for each PF. In other words, after each virtual window closes and/or after initiating a new virtual window, the memory device 120 and/or the controller 130 may reset virtual window credit counters for each PF. Similarly, after each time window closes and/or after initiating a new time window, the memory device 120 and/or the controller 130 may reset a second one or more limits, indicated by the time window credit amounts, for each PF. For example, after each virtual window closes and/or after initiating a new virtual window, the memory device 120 and/or the controller 130 may reset time window credit counters for cach PF.

In some implementations, the memory device 120 and/or the controller 130 perform operations during the time window using a weighted round-robin arbitration technique. Contrary to traditional weighted round-robin arbitration techniques (e.g., which may use a fixed formula or fixed weights), the weighted round-robin arbitration technique may use a round-robin arbitration array that is populated (e.g., by the memory device 120 and/or the controller 130) based on various ratios of the credit amounts of the PFs (and/or on various ratios of QoS limits of the PFs). For example, a quantity of positions in the round-robin arbitration array for a given PF may be proportional to a quantity of credits allocated to the given PF and/or a quantity of I/O queue pairs (e.g., where an I/O queue pair includes a submission queue and a completion queue) associated with the given PF. This may improve a likelihood that PFs that are provisioned with more resources occur more frequently in the round-robin arbitration array.

In some implementations, the time windows may include one or more phases. The one or more phases may be associated with different QoS limits and/or different traffic types for the PFs. For example, different phases may be associated with different credit amounts for the PFs. The different phases may enable the memory device 120 and/or the controller 130 to promote or favor read operations over write operations. For example, heavy random write workloads may cause high write amplification which may significantly degrade throughput performance of the memory device 120. To enable PFs that are operating using predominantly read operations, the different phases may be used during the time window. The one or more phases may include a containment phase, a mixed phase, an expansion phase, a recovery phase, and/or an opportunistic phase, among other examples. The different phases are depicted and described in more detail in connection with FIG. 8.

As indicated above, FIGS. 6A and 6B are provided as examples. Other examples may differ from what is described with regard to FIGS. 6A and 6B.

Figure 7:
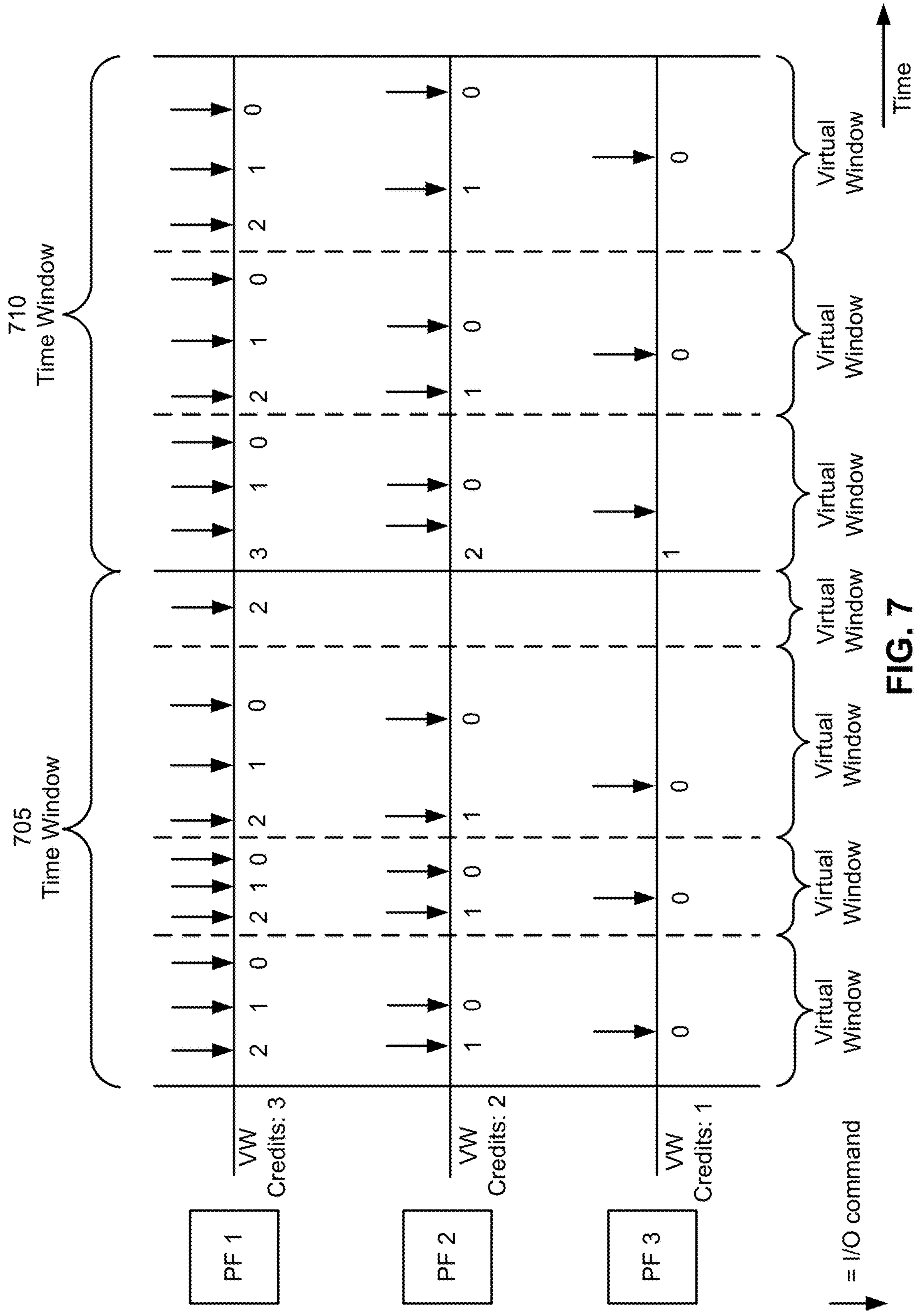
FIG. 7 is a diagram of an example of proportional performance metric control for physical functions of a memory device.

FIG. 7 is a diagram of an example 700 of proportional performance metric control for physical functions of a memory device. The operations described in connection with FIG. 7 may be performed by the memory device 120 and/or one or more components of the memory device 120, such as the controller 130 and/or one or more components of the controller 130. FIG. 7 shows example virtual windows included in a time window 705 and a time window 710. The time window 705 and the time window 710 may be similar to the time windows depicted and described above in connection with FIG. 5.

The memory device 120 and/or the controller 130 may track credits allocated for PFs using time windows and virtual windows. For example, FIG. 7 depicts three PFs (e.g., PF 1, PF 2, and PF 3), but the memory device 120 and/or the controller 130 may be configured to track and/or maintain credits for more or fewer PFs in a similar manner as described herein. A time window (e.g., the time window 705 and/or the time window 710) may be associated with a configured amount of time. For example, a time window may have a duration of 10 milliseconds or another amount of time. Each PF may be configured with one or more time window credit amounts for each time window. For example, each PF may be enabled to use or consume credit amounts (e.g., total bandwidth credits, total IOPS credits, write bandwidth credits, and/or write IOPS credits) within each time window. If the PF performs operations that cause the credits to be used or consumed within a time window, then the PF may not perform additional operations within the time window. After the time window ends and a new time window begins, the credit counters for the PFs may be replenished (e.g., reset to the configured amount of time window credits available for the PFs in each time window).

Additionally, each PF may be configured with one or more virtual window credit amounts. For example, each PF may be enabled to use or consume virtual window credit amounts (e.g., total bandwidth credits, total IOPS credits, write bandwidth credits, and/or write IOPS credits) within each virtual window. If the PF performs operations that cause the virtual window credits to be used or consumed within a virtual window, then the PF may not perform additional operations within the virtual window. After the virtual window closes and a new virtual window begins, the credit counters for the PFs may be replenished (e.g., reset to the configured amount of virtual window credits available for the PFs in each time window).

For example, as shown in FIG. 7, the PF 1 may be allocated with 3 virtual window (VW) credits, the PF 2 may be allocated with 2 virtual window credits, and the PF 3 may be allocated with 1 (one) virtual window credit. As shown in FIG. 7, the virtual windows may have different durations. For example, a duration of a given virtual window may be an amount of time associated with each PF consuming or using the virtual window credits. For example, as shown in FIG. 7, once each PF performs I/O operations that cause all of the virtual window credits to be consumed, the virtual window may be closed and a new virtual window may be initiated. After a virtual window is closed, the available virtual window credits for each PF may be reset to the allocated amounts (e.g., 3 for PF 1, 2 for PF 2, and 1 for PF 3).

For example, the PF 1 may be associated with a virtual window credit amount of 3 and a time window credit amount of 10. Therefore, in each virtual window, the PF 1 may be enabled to perform I/O commands or operations that result in 3 credits being consumed. Additionally, in each time window (e.g., the time window 705 or the time window 710) the PF 1 may be enabled to perform I/O commands or operations that result in 10 credits being consumed. For example, virtual window credit quotas may be used by PFs in the same way as the time window credits are used, except that the virtual window does not close after a fixed amount of time, but only after each PF has consumed the virtual window credit quota.

In some implementations, if one or more PFs have no commands available to download, but all other PFs have consumed their virtual window credits, then the virtual window may close (e.g., to avoid being delayed by bursty activity and/or inactive virtual machines). Because each PF may consume the virtual window credit quota in each virtual window, proportionality among the PFs may be ensured and/or improved. For example, when the memory device performance drops below a threshold, at the end of a time window, there may be less than L virtual windows completed (e.g., where L is the expected quantity of virtual windows based on the calculated credits as described above in more detail). However, the proportionality may have been ensured with a small deviation because the deviation may have occurred only in a single virtual window (or a small quantity of virtual windows), rather than in the entire time window.

As indicated above, FIG. 7 is provided as an example. Other examples may differ from what is described with regard to FIG. 7.

Figure 8:
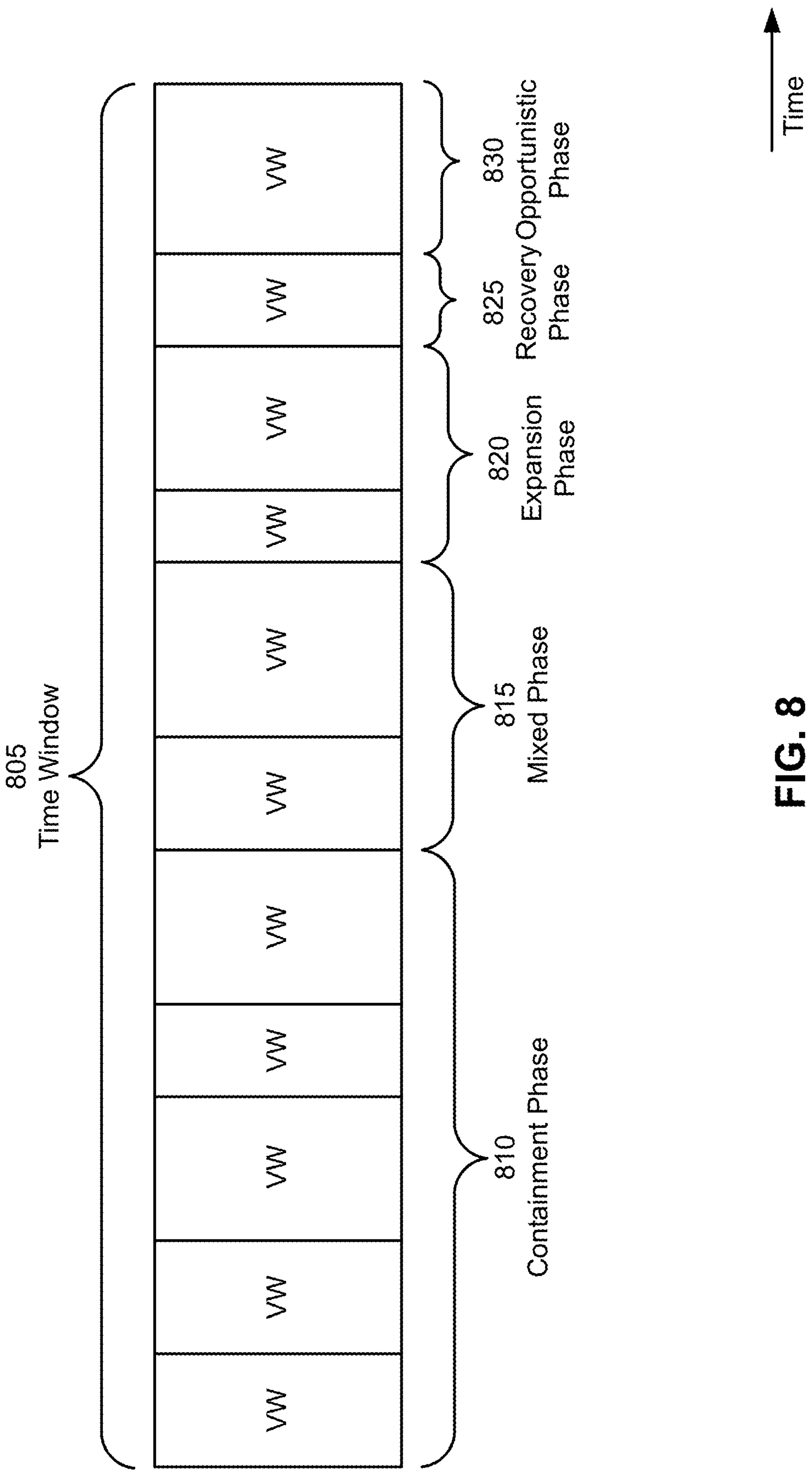
FIG. 8 is a diagram of an example of time window phases associated with proportional performance metric control for physical functions of the memory device.

FIG. 8 is a diagram of an example 800 of time window phases associated with proportional performance metric control for physical functions of the memory device 120. The operations described in connection with FIG. 8 may be performed by the memory device 120 and/or one or more components of the memory device 120, such as the controller 130 and/or one or more components of the controller 130.

As shown in FIG. 8, a time window 805 may be associated with one or more phases. For example, the time window 805 may be associated with a containment phase 810 (also referred to herein as a first phase), a mixed phase 815 (also referred to herein as a second phase), an expansion phase 820 (also referred to herein as a third phase), a recovery phase 825 (also referred to herein as a fourth phase), and/or an opportunistic phase 830 (also referred to herein as a fifth phase). In some cases, a time window may include one or more of the phases described herein. For example, a first time window may include only the containment phase 810, a second time window may include the containment phase 810 and the mixed phase 815, a third time window may include the containment phase 810, the mixed phase 815, and the expansion phase 820, a fourth time window may include the containment phase 810, the mixed phase 815, the expansion phase 820, and the recovery phase 825, and a fifth time window may include the containment phase 810, the mixed phase 815, the expansion phase 820, the recovery phase 825, and the opportunistic phase 830.

For example, the phases included in a given time window may be based on limits or credits consumed by various PFs during each time window and/or a given phase. For example, the phases may follow an order (in time) of the containment phase 810, followed by the mixed phase 815, followed by the expansion phase 820, followed by the recovery phase 825, and followed by the opportunistic phase 830. The memory device 120 and/or the controller 130 may move to a next phase based on criteria of a current phase being met or satisfied, as described elsewhere herein.

The containment phase 810 may occur at the start of each time window. The containment phase 810 may be referred to as a write containment phase. For example, the containment phase 810 may be associated with containing PFs associated with a high or heavy write workload (e.g., to promote or prioritize read operations associated with other PFs). For example, during the containment phase 810, an additional credit limit may be introduced. The additional credit limit may be a write containment credit amount. The write containment credit amount may be less than a write credit amount. For example, each PF may be configured with a write containment credit amount that is a percentage of a write credit amount for each time window and/or for each virtual window. During the containment phase 810, the memory device 120 and/or the controller 130 may be configured to perform operations until the write containment credit amount or the one or more other credit amounts for the respective physical functions are utilized.

If a given PF uses all of the write containment credit amounts for a virtual window and/or a time window, the given PF may be dropped from arbitration for that virtual window and/or that time window. In other words, the memory device 120 and/or the controller 130 may refrain from performing operations, during the containment phase 810, for a PF, from the set of PFs, that has utilized the write containment credit amount for the PF. In this way, PFs associated with predominantly read workloads may be enabled to reach credit limits while PFs associated with predominantly write workloads may be dropped and/or contained.

After each PF consumes the write containment credit amount or the one or more other credit amounts, the memory device 120 and/or the controller 130 may transition to the mixed phase 815. During the mixed phase, PFs that consumed the write containment credit amount during the containment phase 810 may operate. For example, PFs that were dropped from arbitration during the containment phase 810 may operate during the mixed phase 815 (e.g., because other PFs may be enabled to consume total credit amounts for the entire time window during the containment phase 810). During the mixed phase 815, read operations may be prioritized over write operations by dropping PFs from arbitration that use a total write credit amount during the mixed phase 815. Additionally, or alternatively, during the mixed phase 815, read operations may be prioritized over write operations by dropping PFs from arbitration that are associated with (e.g., during a virtual window) a write-to-read credit ratio that satisfies a write threshold. The write-to-read credit ratio may be a ratio of the write credits to the read credits used by a given PF during a virtual window (e.g., a write credit amount compared to a read credit amount used by the given PF). Other PFs that have a mixed workload or a predominantly read workload may be enabled to continue to perform operations during the mixed phase 815 until a total credit amount for the time window is used by the PFs.

After each PF operating during the mixed phase 815 is either dropped from arbitration (e.g., because a write credit amount is consumed or because a write-to-read credit ratio satisfies a threshold) or has consumed a credit amount (e.g., a total credit amount or any other configured or allocated credit amount) for the time window 805, the memory device 120 and/or the controller 130 may transition to the expansion phase 820. During the expansion phase 820, all previously dropped PFs are allowed to operate until the PFs reach one of their write or total limits for the time window. For example, PFs that are dropped from arbitration (e.g., where the memory device 120 has refrained from performing operations of the PFs) during the containment phase 810 and/or the mixed phase 815 are allowed to operate and consume credits until either the total credit amount or a write operation credit amount is utilized for the time window 805.

After each PF uses either the total credit amount or the write operation credit amount for the time window 805, the memory device 120 and/or the controller 130 may transition to the recovery phase 825. During the recovery phase 825, operations may be performed for any PFs that have unutilized credit amounts from a previous time window. For example, in the previous time window, a given PF may be unable to consume or utilize all of the credits available for the given PF. During the recovery phase 825, the given PF may be enabled to operate and consume or utilize the credits left over from the previous time window and/or an allowed portion of the credits left over from the previous time window.

If all PFs have reached QoS limits (e.g., have consumed credits) before the end of the time window 805, there may be unutilized throughput of the memory device 120 for the time window 805. To take advantage of the unutilized throughput of the memory device 120, the memory device 120 and/or the controller 130 may transition to the opportunistic phase 830. During the opportunistic phase 830, PFs that have already reached one of the write credit limits (e.g., write operation bandwidth limit and/or write operation IOPS limit) are allowed to operate until the PF(s) reach a total limit for the time window 805 (e.g., potentially using write credits borrowed from a next or future time window). For example, if the operations performed during the opportunistic phase 830 are read operations, performance of the memory device 120 may be improved by increasing throughput that would have otherwise been unused. If the operations performed during the opportunistic phase 830 include write operations, then the write credits for the write operations may be "borrowed" from the next time window (e.g., and a write credit amount for the PFs for the next time window may be decreased by an amount of credits used (or borrowed) by the PFs during the opportunistic phase 830).

The transitions between different phases may occur at transitions between virtual windows. For example, a given virtual window may be associated with a single phase. When the memory device 120 and/or the controller 130 initiates a new virtual window, the memory device 120 and/or the controller 130 may also transition to a new phase, as described in more detail elsewhere herein.

As indicated above, FIG. 8 is provided as an example. Other examples may differ from what is described with regard to FIG. 8.

Figure 9:
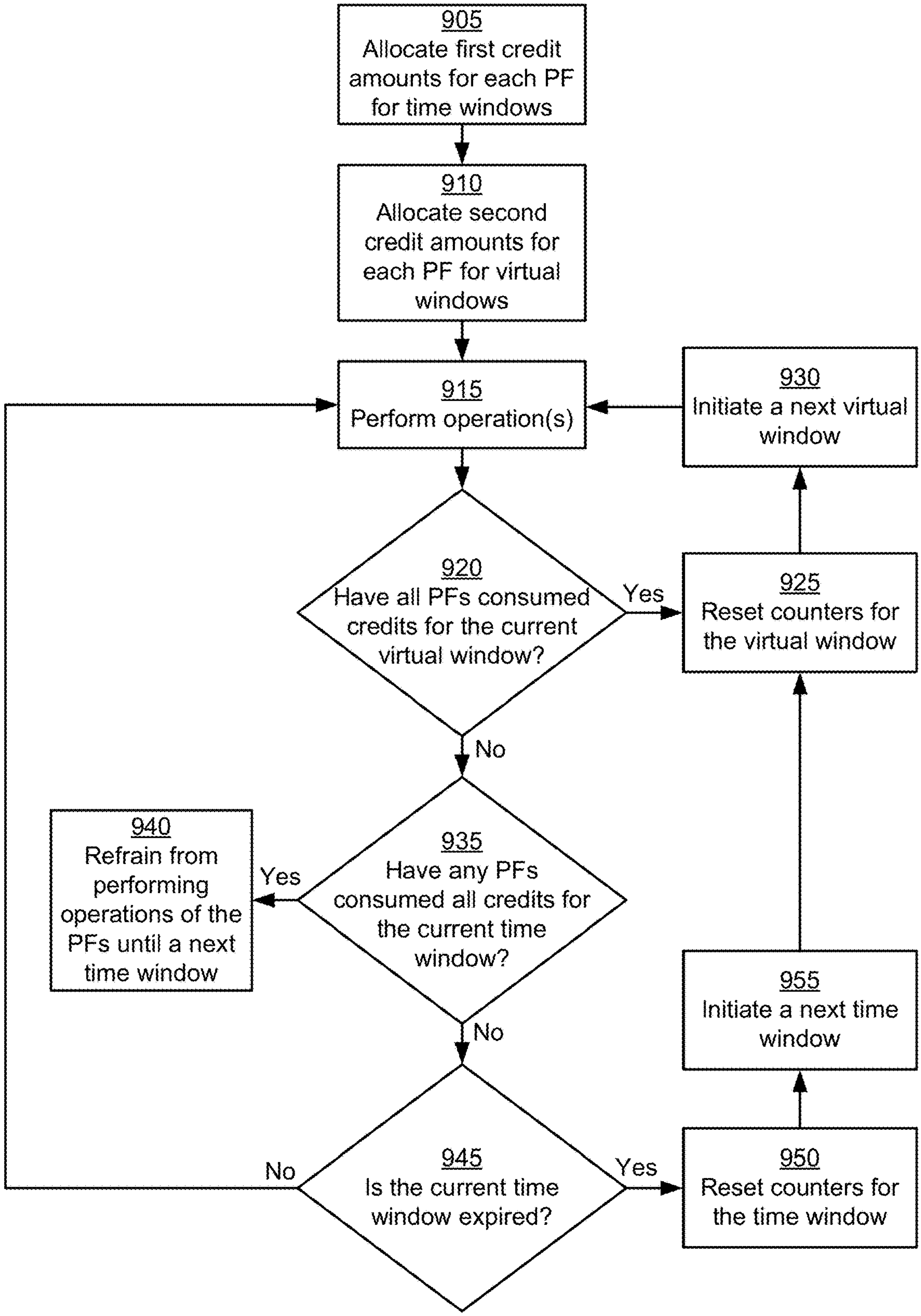
FIG. 9 is a diagram of an example of proportional performance metric control for physical functions of a memory device.

FIG. 9 is a diagram of an example 900 of proportional performance metric control for physical functions of a memory device. The operations described in connection with FIG. 9 may be performed by the memory device 120 and/or one or more components of the memory device 120, such as the controller 130 and/or one or more components of the controller 130.

As shown in FIG. 9, the memory device 120 and/or the controller 130 may allocate first credit amounts for each PF for time windows (block 905). For example, the first credit amounts may be time window credit amounts, as described in more detail elsewhere herein. The memory device 120 and/or the controller 130 may allocate one or more time window credit amounts for respective PFs. The memory device 120 and/or the controller 130 may allocate second credit amounts for each PF for virtual windows (block 910). For example, the first credit amounts may be virtual window credit amounts, as described in more detail elsewhere herein. The memory device 120 and/or the controller 130 may allocate one or more virtual window credit amounts for respective PFs.

The memory device 120 and/or the controller 130 may perform one or more operations (block 915). For example, a given operation may be associated with a given PF of the memory device 120. As the memory device 120 and/or the controller 130 performs an operation for a given PF, the memory device 120 and/or the controller 130 may decrement corresponding credit counters for the given PF. For example, if a write operation is performed, then the memory device 120 and/or the controller 130 may decrement a time window write credit counter and a virtual window write credit counter for the PF associated with the write operation.

The memory device 120 and/or the controller 130 may determine whether all PFs have consumed all credits for a current virtual window (block 920). For example, the memory device 120 and/or the controller 130 may determine whether each PF has consumed the virtual window credit amount(s) allocated for the PFs. If each PF has consumed all of the virtual window credit amount(s) allocated for the PFs for the current virtual window (Yes), then the memory device 120 and/or the controller 130 may reset counters (e.g., credit counters) for the virtual windows (block 925). For example, virtual window credit counters for each PF may be reset to the allocated credit amount(s) for virtual windows. The memory device 120 and/or the controller 130 may initiate a next virtual window (block 930). The memory device 120 and/or the controller 130 may perform operations in the next virtual window in a similar manner as described herein.

If each PF has consumed all of the virtual window credit amount(s) allocated for the PFs for the current virtual window (No), then the memory device 120 and/or the controller 130 may determine whether any PFs have consumed all credits for the current time window (block 935). In some implementations, the determination of block 935 may be made by the memory device 120 and/or the controller 130 irrespective of the outcome of, and/or in conjunction with, the block 920. The memory device 120 and/or the controller 130 may determine whether any PFs have consumed total credit amounts and/or write credit amounts for the current time window. If a PF has consumed the total credit amounts and/or write credit amounts for the current time window (Yes), then the memory device 120 and/or the controller 130 may refrain from performing operations for the PF until a next time window (block 940).

Additionally, the memory device 120 and/or the controller 130 may determine whether the current time window is expired (block 945). If the current time window is not expired (No), then the memory device 120 and/or the controller 130 may continue to perform operations as described elsewhere herein. If the current time window is expired (Yes), then the memory device 120 and/or the controller 130 may reset counters (e.g., credit counters) for the time window (block 950). For example, time window credit counters for each PF may be reset to the allocated credit amount(s) for time windows. The memory device 120 and/or the controller 130 may initiate a time virtual window (block 955). Additionally, the memory device 120 and/or the controller 130 may reset virtual window credit counters and initiate a next virtual window (e.g., as described in connection with block 925 and block 930, respectively). The memory device 120 and/or the controller 130 may perform operations in the next time window in a similar manner as described herein.

Although FIG. 9 shows example blocks of the example 900, in some implementations, the example 900 may include additional blocks, fewer blocks, different blocks, or differently arranged blocks than those depicted in FIG. 9. Additionally, or alternatively, two or more of the blocks of the example 900 may be performed in parallel. The example 900 is an example of one method that may be performed by one or more devices described herein. These one or more devices may perform or may be configured to perform one or more other methods based on operations described herein.

Figure 10:
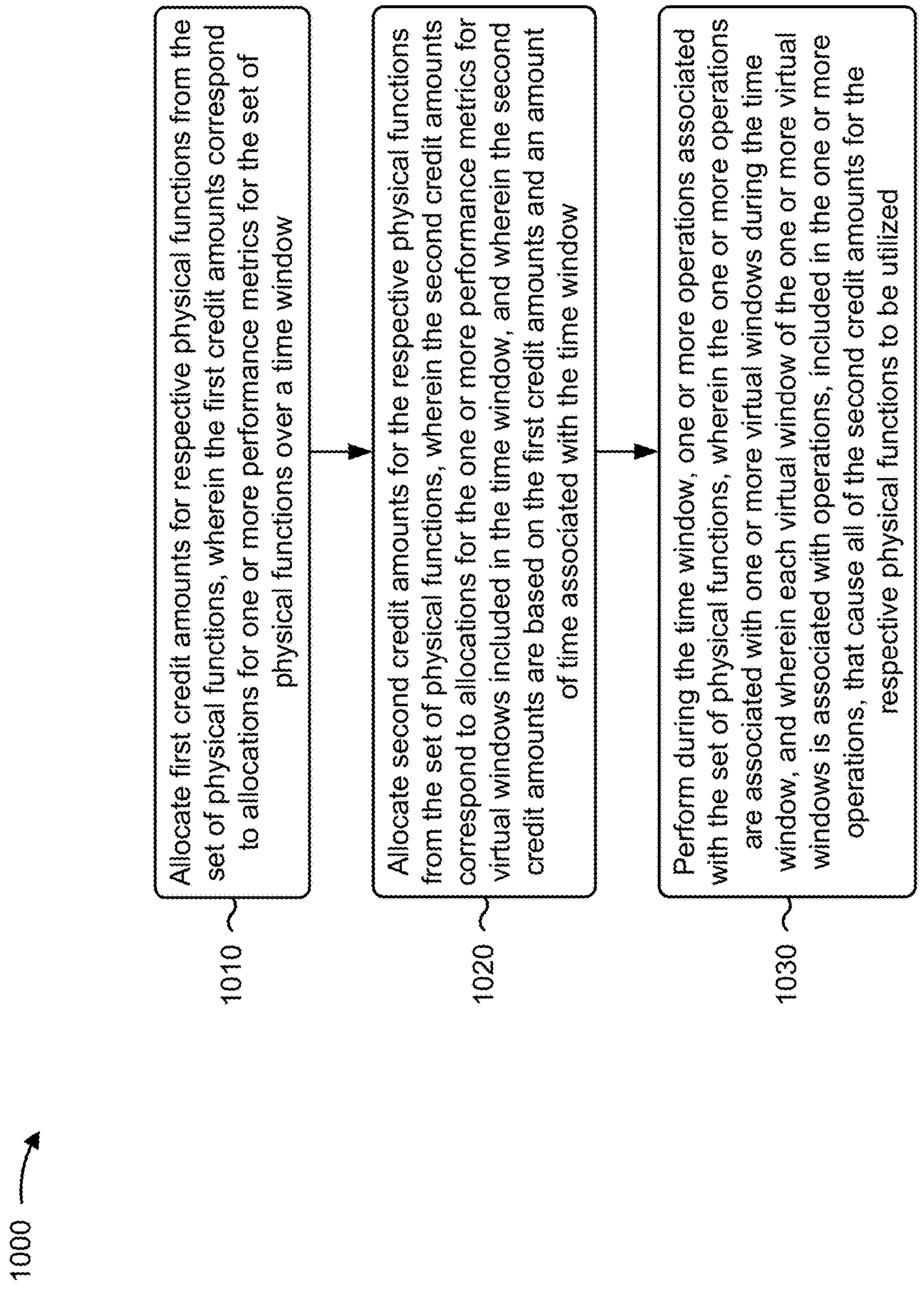
FIG. 10 is a flowchart of an example method associated with proportional performance metric control for physical functions of a memory device.

FIG. 10 is a flowchart of an example method 1000 associated with proportional performance metric control for physical functions of a memory device. In some implementations, a memory device (e.g., the memory device 120) may perform or may be configured to perform the method 1000. In some implementations, another device or a group of devices separate from or including the memory device (e.g., the system 100) may perform or may be configured to perform the method 1000. Additionally, or alternatively, one or more components of the memory device (e.g., the controller 130, the memory management component 225, the PF management component 230, and/or the credit counter component 235) may perform or may be configured to perform the method 1000. Thus, means for performing the method 1000 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 1000.

As shown in FIG. 10, the method 1000 may include allocating first credit amounts for respective physical functions from the set of physical functions, wherein the first credit amounts correspond to allocations for one or more performance metrics for the set of physical functions over a time window (block 1010). As further shown in FIG. 10, the method 1000 may include allocating second credit amounts for the respective physical functions from the set of physical functions, wherein the second credit amounts correspond to allocations for the one or more performance metrics for virtual windows included in the time window, and wherein the second credit amounts are based on the first credit amounts and an amount of time associated with the time window (block 1020). As further shown in FIG. 10, the method 1000 may include performing, during the time window, one or more operations associated with the set of physical functions, wherein the one or more operations are associated with one or more virtual windows during the time window, and wherein each virtual window from the one or more virtual windows is associated with operations, included in the one or more operations, that cause all of the second credit amounts for the respective physical functions to be utilized (block 1030).

The method 1000 may include additional aspects, such as any single aspect or any combination of aspects described below and/or described in connection with one or more other methods or operations described elsewhere herein.

In a first aspect, the method 1000 includes calculating, for a physical function from the set of physical functions, a credit amount, from the second credit amounts, for the physical function by dividing allocated credits, from the first credit amounts, for the physical function by a value that is based on the amount of time associated with the time window.

In a second aspect, alone or in combination with the first aspect, the one or more performance metrics include at least one of a total IOPS metric, a write operation IOPS metric, a total bandwidth metric, or a write operation bandwidth metric.

In a third aspect, alone or in combination with one or more of the first and second aspects, the method 1000 includes performing, during a virtual window from the one or more virtual windows, an operation, from the one or more operations, associated with a physical function from the set of physical functions, and decrementing a counter associated with the physical function based on performing the operation, wherein the counter is associated with tracking a credit amount, from the second credit amounts, that is associated with the physical function and the virtual window.

In a fourth aspect, alone or in combination with one or more of the first through third aspects, the one or more virtual windows are associated with variable durations, and the variable durations are based on an amount of time associated with performing the operations that cause all of the second credit amounts for the respective physical functions to be utilized.

In a fifth aspect, alone or in combination with one or more of the first through fourth aspects, the time window is associated with a first phase during which the second credit amounts include a write containment credit amount and one or more other credit amounts for the respective physical functions, wherein the write containment credit amount is less than a write credit amount that is based on the first credit amounts, and wherein the one or more components, to perform the one or more operations, are configured to performing, during the first phase, operations until the write containment credit amount or the one or more other credit amounts for the respective physical functions are utilized.

In a sixth aspect, alone or in combination with one or more of the first through fifth aspects, the method 1000 includes refraining from performing operations, during the first phase, for a physical function, from the set of physical functions, that has utilized the write containment credit amount.

In a seventh aspect, alone or in combination with one or more of the first through sixth aspects, the time window is associated with a second phase during which operations are performed for one or more physical functions, from the set of physical functions, that utilized the write containment credit amount during the first phase.

In an eighth aspect, alone or in combination with one or more of the first through seventh aspects, the time window is associated with a third phase during which operations, from the one or more operations, are performed for any physical functions, from the set of physical functions, that are dropped during the first phase or the second phase.

In a ninth aspect, alone or in combination with one or more of the first through eighth aspects, the time window is associated with a fourth phase during which operations, from the one or more operations, are performed for any physical functions, from the set of physical functions, that have unutilized credit amounts from a previous time window.

In a tenth aspect, alone or in combination with one or more of the first through ninth aspects, the time window is associated with a fifth phase during which operations, from the one or more operations, are performed for any physical functions, from the set of physical functions, that have utilized write credit amounts, indicated by the first credit amounts, and have not utilized a total credit amount indicated by the first credit amounts.

Although FIG. 10 shows example blocks of a method 1000, in some implementations, the method 1000 may include additional blocks, fewer blocks, different blocks, or differently arranged blocks than those depicted in FIG. 10. Additionally, or alternatively, two or more of the blocks of the method 1000 may be performed in parallel. The method 1000 is an example of one method that may be performed by one or more devices described herein. These one or more devices may perform or may be configured to perform one or more other methods based on operations described herein.

Figure 11:
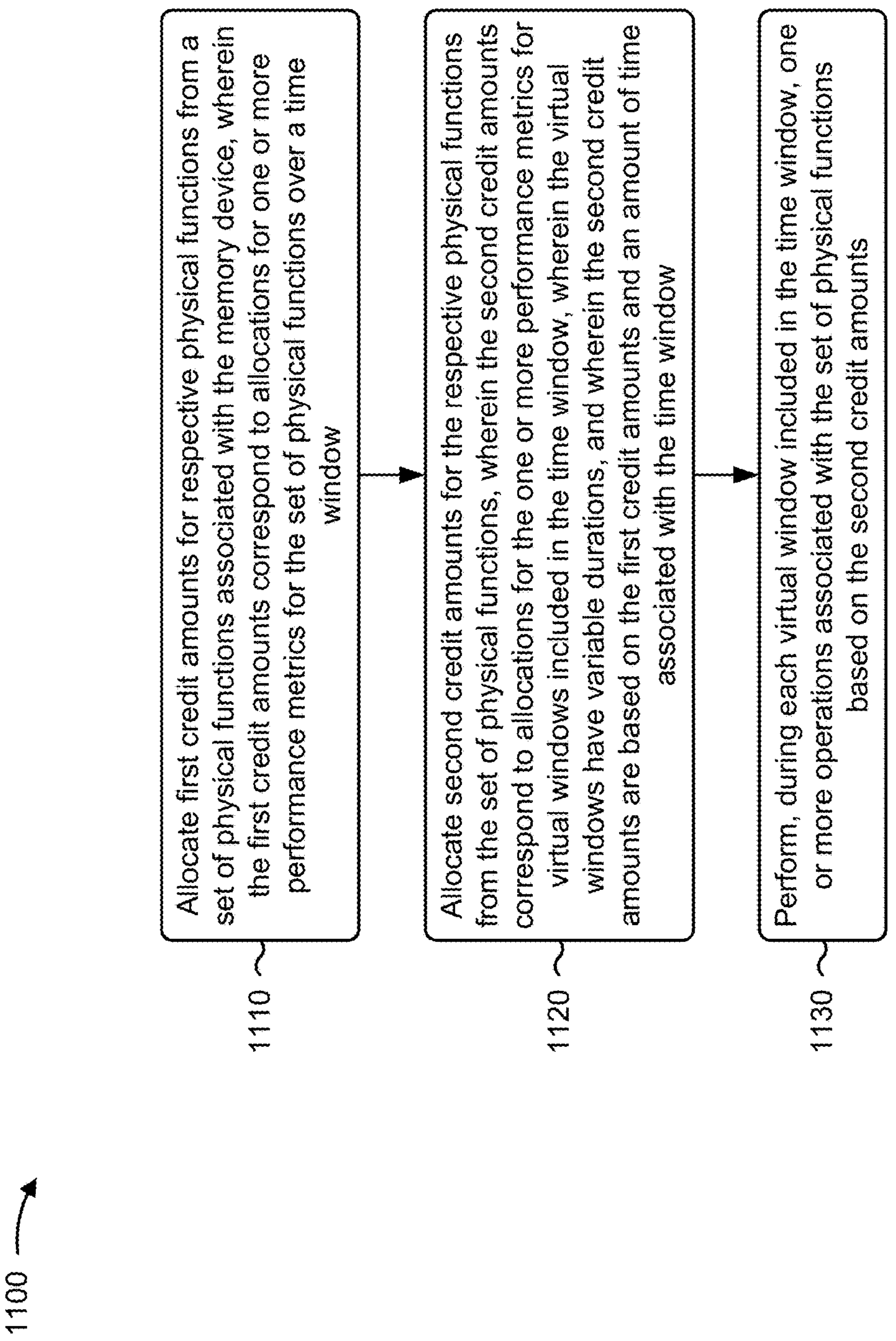
FIG. 11 is a flowchart of an example method associated with proportional performance metric control for physical functions of a memory device.

FIG. 11 is a flowchart of an example method 1100 associated with proportional performance metric control for physical functions of a memory device. In some implementations, a memory device (e.g., the memory device 120) may perform or may be configured to perform the method 1100. In some implementations, another device or a group of devices separate from or including the memory device (e.g., the system 100) may perform or may be configured to perform the method 1100. Additionally, or alternatively, one or more components of the memory device (e.g., the controller 130, the memory management component 225, the PF management component 230, and/or the credit counter component 235) may perform or may be configured to perform the method 1100. Thus, means for performing the method 1100 may include the memory device and/or one or more components of the memory device. Additionally, or alternatively, a non-transitory computer-readable medium may store one or more instructions that, when executed by the memory device (e.g., the controller 130 of the memory device 120), cause the memory device to perform the method 1100.

As shown in FIG. 11, the method 1100 may include allocating first credit amounts for respective physical functions from a set of physical functions associated with the memory device, wherein the first credit amounts correspond to allocations for one or more performance metrics for the set of physical functions over a time window (block 1110). As further shown in FIG. 11, the method 1100 may include allocating second credit amounts for the respective physical functions from the set of physical functions, wherein the second credit amounts correspond to allocations for the one or more performance metrics for virtual windows included in the time window, wherein the virtual windows have variable durations, and wherein the second credit amounts are based on the first credit amounts and an amount of time associated with the time window (block 1120). As further shown in FIG. 11, the method 1100 may include performing, during each virtual window included in the time window, one or more operations associated with the set of physical functions based on the second credit amounts (block 1130).

The method 1100 may include additional aspects, such as any single aspect or any combination of aspects described below and/or described in connection with one or more other methods or operations described elsewhere herein.

In a first aspect, the first credit amounts include a first one or more credit amounts indicating one or more limits for the one or more performance metrics during the time window, and the second credit amounts include a second one or more credit amounts indicating one or more limits for the one or more performance metrics during each virtual window.

In a second aspect, alone or in combination with the first aspect, the time window includes at least one of a containment phase, a mixed phase, an expansion phase, a recovery phase, or an opportunistic phase.

In a third aspect, alone or in combination with one or more of the first and second aspects, the containment phase is associated with a write containment credit amount, and performing the one or more operations comprises performing, during the containment phase, operations included in the one or more operations, and refraining from performing, during the containment phase, operations for one or more physical functions that have used the write containment credit amount for the one or more physical functions or that have used a total credit amount indicated by the first credit amounts for the one or more physical functions.

In a fourth aspect, alone or in combination with one or more of the first through third aspects, the write containment credit amount is based on a write credit amount indicated by the first credit amounts.

In a fifth aspect, alone or in combination with one or more of the first through fourth aspects, performing the one or more operations comprises performing, during the mixed phase, operations included in the one or more operations for physical functions that reach a write containment credit amount during the containment phase, and refraining from performing, during the mixed phase, operations for one or more physical functions that have used a total write credit amount indicated by the first credit amounts for the one or more physical functions or that are associated with a write-to-read credit ratio that satisfies a threshold.

In a sixth aspect, alone or in combination with one or more of the first through fifth aspects, performing the one or more operations comprises performing, during the expansion phase, operations included in the one or more operations for physical functions for which operations were ceased during the containment phase or the mixed phase.

In a seventh aspect, alone or in combination with one or more of the first through sixth aspects, performing the one or more operations comprises performing, during the recovery phase, operations included in the one or more operations for physical functions associated with remaining first credit amounts from one or more previous time windows.

In an eighth aspect, alone or in combination with one or more of the first through seventh aspects, performing the one or more operations comprises performing, during the opportunistic phase, operations included in the one or more operations for physical functions that have not used a total credit amount indicated by the first credit amounts for the time window.

Although FIG. 11 shows example blocks of a method 1100, in some implementations, the method 1100 may include additional blocks, fewer blocks, different blocks, or differently arranged blocks than those depicted in FIG. 11. Additionally, or alternatively, two or more of the blocks of the method 1100 may be performed in parallel. The method 1100 is an example of one method that may be performed by one or more devices described herein. These one or more devices may perform or may be configured to perform one or more other methods based on operations described herein.

In some implementations, a memory device includes a set of physical functions; and one or more components configured to: allocate first credit amounts for respective physical functions from the set of physical functions, wherein the first credit amounts correspond to allocations for one or more performance metrics for the set of physical functions over a time window; allocate second credit amounts for the respective physical functions from the set of physical functions, wherein the second credit amounts correspond to allocations for the one or more performance metrics for virtual windows included in the time window, and wherein the second credit amounts are based on the first credit amounts and an amount of time associated with the time window; and perform, during the time window, one or more operations associated with the set of physical functions, wherein the one or more operations are associated with one or more virtual windows during the time window, and wherein each virtual window from the one or more virtual windows is associated with operations, included in the one or more operations, that cause all of the second credit amounts for the respective physical functions to be utilized.

In some implementations, a method includes allocating, by a memory device, first credit amounts for respective physical functions from a set of physical functions associated with the memory device, wherein the first credit amounts correspond to allocations for one or more performance metrics for the set of physical functions over a time window; allocating, by the memory device, second credit amounts for the respective physical functions from the set of physical functions, wherein the second credit amounts correspond to allocations for the one or more performance metrics for virtual windows included in the time window, wherein the virtual windows have variable durations, and wherein the second credit amounts are based on the first credit amounts and an amount of time associated with the time window; and performing, by the memory device and during each virtual window included in the time window, one or more operations associated with the set of physical functions based on the second credit amounts.

In some implementations, an apparatus includes means for allocating first credit amounts for respective physical functions from a set of physical functions associated with the apparatus, wherein the first credit amounts correspond to allocations for one or more performance metrics for the set of physical functions over a time window; means for allocating second credit amounts for the respective physical functions from the set of physical functions, wherein the second credit amounts correspond to allocations for the one or more performance metrics for virtual windows included in the time window, and wherein the second credit amounts are based on the first credit amounts and an amount of time associated with the time window; and means for performing, during each virtual window included in the time window, one or more operations associated with the set of physical functions based on the second credit amounts.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
a set of physical functions; and
one or more components configured to:
allocate first credit amounts for respective physical functions from the set of physical functions,
wherein the first credit amounts correspond to allocations for one or more performance metrics for the set of physical functions over a time window;
allocate second credit amounts for the respective physical functions from the set of physical functions,
wherein the second credit amounts correspond to allocations for the one or more performance metrics for virtual windows included in the time window, and
wherein the second credit amounts are based on the first credit amounts and an amount of time associated with the time window; and
perform, during the time window, one or more operations associated with the set of physical functions,
wherein the one or more operations are associated with one or more virtual windows during the time window, and
wherein each virtual window from the one or more virtual windows is associated with operations, included in the one or more operations, that cause all of the second credit amounts for the respective physical functions to be utilized.

2. The memory device of claim 1, wherein the one or more components, to allocate the second credit amounts, are configured to:
calculate, for a physical function from the set of physical functions, a credit amount, from the second credit amounts, for the physical function by dividing allocated credits, from the first credit amounts, for the physical function by a value that is based on the amount of time associated with the time window.

3. The memory device of claim 1, wherein the one or more components, to perform the one or more operations, are configured to:

perform, during a virtual window from the one or more virtual windows, an operation, from the one or more operations, associated with a physical function from the set of physical functions; and decrement a counter associated with the physical function based on performing the operation, wherein the counter is associated with tracking a credit amount, from the second credit amounts, that is associated with the physical function and the virtual window.

4. The memory device of claim 1, wherein the one or more virtual windows are associated with variable durations, and wherein the variable durations are based on an amount of time associated with performing the operations that cause all of the second credit amounts for the respective physical functions to be utilized.

5. The memory device of claim 1, wherein the time window is associated with a first phase during which the second credit amounts include a write containment credit amount and one or more other credit amounts for the respective physical functions, wherein the write containment credit amount is less than a write credit amount that is based on the first credit amounts, and wherein the one or more components, to perform the one or more operations, are configured to:

perform, during the first phase, operations until the write containment credit amount or the one or more other credit amounts for the respective physical functions are utilized.

6. The memory device of claim 5, wherein the one or more components, to perform the one or more operations, are configured to:

refrain from performing operations, during the first phase, for a physical function, from the set of physical functions, that has utilized the write containment credit amount.

7. The memory device of claim 5, wherein the time window is associated with a second phase during which operations are performed for one or more physical functions, from the set of physical functions, that utilized the write containment credit amount during the first phase.

8. The memory device of claim 7, wherein the time window is associated with a third phase during which operations, from the one or more operations, are performed for any physical functions, from the set of physical functions, that are dropped during the first phase or the second phase.

9. The memory device of claim 5, wherein the time window is associated with a fourth phase during which operations, from the one or more operations, are performed for any physical functions, from the set of physical functions, that have unutilized credit amounts from a previous time window.

10. A method, comprising:

allocating, by a memory device, first credit amounts for respective physical functions from a set of physical functions associated with the memory device, wherein the first credit amounts correspond to allocations for one or more performance metrics for the set of physical functions over a time window;

allocating, by the memory device, second credit amounts for the respective physical functions from the set of physical functions, wherein the second credit amounts correspond to allocations for the one or more performance metrics for virtual windows included in the time window, wherein the virtual windows have variable durations, and wherein the second credit amounts are based on the first credit amounts and an amount of time associated with the time window; and performing, by the memory device and during each virtual window included in the time window, one or more operations associated with the set of physical functions based on the second credit amounts.

11. The method of claim 10, wherein the first credit amounts include a first one or more credit amounts indicating one or more limits for the one or more performance metrics during the time window, and wherein the second credit amounts include a second one or more credit amounts indicating one or more limits for the one or more performance metrics during each virtual window.

12. The method of claim 10, wherein the time window includes at least one of:

a containment phase, a mixed phase, an expansion phase, a recovery phase, or an opportunistic phase.

13. The method of claim 12, wherein the containment phase is associated with a write containment credit amount, and wherein performing the one or more operations comprises:

performing, during the containment phase, operations included in the one or more operations; and refraining from performing, during the containment phase, operations for one or more physical functions that have used the write containment credit amount for the one or more physical functions or that have used a total credit amount indicated by the first credit amounts for the one or more physical functions.

14. The method of claim 12, wherein performing the one or more operations comprises:

performing, during the mixed phase, operations included in the one or more operations for physical functions that reach a write containment credit amount during the containment phase; and refraining from performing, during the mixed phase, operations for one or more physical functions that have used a total write credit amount indicated by the first credit amounts for the one or more physical functions or that are associated with a write-to-read credit ratio that satisfies a threshold.

15. The method of claim 12, wherein performing the one or more operations comprises:

performing, during the expansion phase, operations included in the one or more operations for physical functions for which operations were ceased during the containment phase or the mixed phase.

16. The method of claim 12, wherein performing the one or more operations comprises:

performing, during the recovery phase, operations included in the one or more operations for physical functions associated with remaining first credit amounts from one or more previous time windows.

17. An apparatus, comprising:

means for allocating first credit amounts for respective physical functions from a set of physical functions associated with the apparatus, wherein the first credit amounts correspond to allocations for one or more performance metrics for the set of physical functions over a time window;

means for allocating second credit amounts for the respective physical functions from the set of physical functions, wherein the second credit amounts correspond to allocations for the one or more performance metrics for virtual windows included in the time window, and wherein the second credit amounts are based on the first credit amounts and an amount of time associated with the time window; and means for performing, during each virtual window included in the time window, one or more operations associated with the set of physical functions based on the second credit amounts.

18. The apparatus of claim 17, wherein the first credit amounts indicate a first one or more limits for the one or more performance metrics for the respective physical functions during the time window, and wherein the second credit amounts indicate a second one or more limits for the one or more performance metrics for the respective physical functions during each virtual window.

19. The apparatus of claim 17, wherein the means for performing, during each virtual window included in the time window, the one or more operations comprises:

means for performing, during a first virtual window, a first one or more operations until one or more limits, indicated by the second credit amounts for each physical function, are met; and means for performing, during a second virtual window, a second one or more operations until the one or more limits are met.

20. The apparatus of claim 17, further comprising:

means for resetting a first one or more limits, indicated by the second credit amounts, for each physical function after each virtual window; and means for resetting a second one or more limits, indicated by the first credit amounts, for each physical function after the time window.

* * * * *